United States Patent
Murray et al.

(10) Patent No.: US 6,185,666 B1
(45) Date of Patent: Feb. 6, 2001

(54) MERGING COMPUTER PARTITIONS

(75) Inventors: Golden E. Murray, Mapleton; Adam L. Bringhurst, Provo; Theron M. Stoddard, Highland, all of UT (US)

(73) Assignee: PowerQuest Corporation, Orem, UT (US)

(*) Notice: Under 35 U.S.C. 154(b), the term of this patent shall be extended for 0 days.

(21) Appl. No.: 09/394,486

(22) Filed: Sep. 11, 1999

(51) Int. Cl.$^7$ .................................................. G06F 12/02
(52) U.S. Cl. ............................................ 711/173; 713/100
(58) Field of Search .................................. 711/170, 173; 713/1, 2, 100; 707/205

(56) References Cited

U.S. PATENT DOCUMENTS

| | | | |
|---|---|---|---|
| 5,675,769 | 10/1997 | Ruff et al. | 395/497.04 |
| 5,706,472 | 1/1998 | Ruff et al. | 395/497.04 |
| 5,784,702 | * 7/1998 | Greenstein et al. | 711/173 |
| 5,907,672 | 5/1999 | Matze et al. | 395/182.06 |
| 5,930,831 | * 7/1999 | Marsh et al. | 711/173 |
| 5,956,745 | 9/1999 | Bradford et al. | 711/137 |

OTHER PUBLICATIONS

PowerQuest, "PartitionMagic 3.0 User Guide", Version 8, pp. 31–33, 36–43, 58–68, 125, 128, 1997.*
Partition Resizer V. 1.3.3, "Presizer.Doc", http://members.xoom.com/_XMCM/Zeleps/, 1998.*
Andreas Heib, "Merge Two Partitions", Jul. 1999*

* cited by examiner

Primary Examiner—Do Hyun Yoo
Assistant Examiner—Gary J. Portka
(74) Attorney, Agent, or Firm—Computer Law

(57) ABSTRACT

Methods and systems are provided for merging computer disk partitions to reduce the number of partitions. Unlike conventional approaches that rely on FDISK, the invention does not destroy user data on the disk during or after the two or more partitions are merged. Two or more adjoining partitions may be combined. During a merging operation, partitions may have their clusters aligned or resized. The merging partitions may also have their partition type changed. During the merge at least one copy of all system and user data of all partitions is kept on a disk at all times, reducing the risk of data loss.

49 Claims, 5 Drawing Sheets

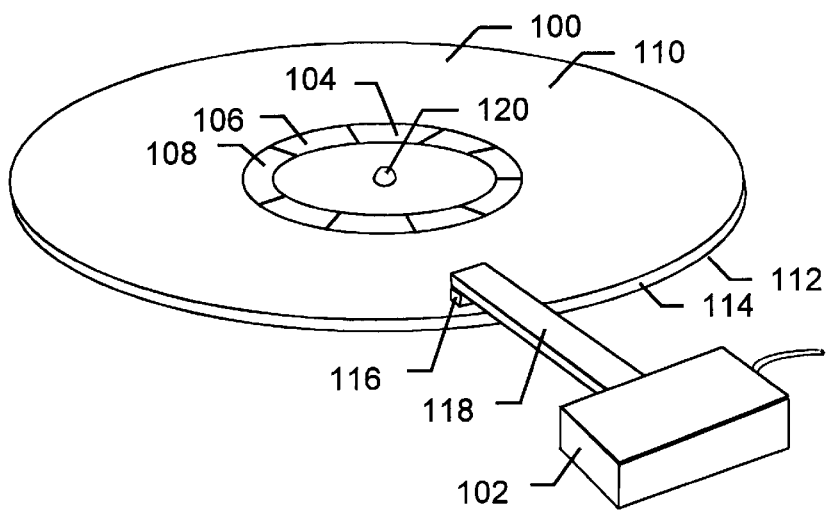
Fig. 1
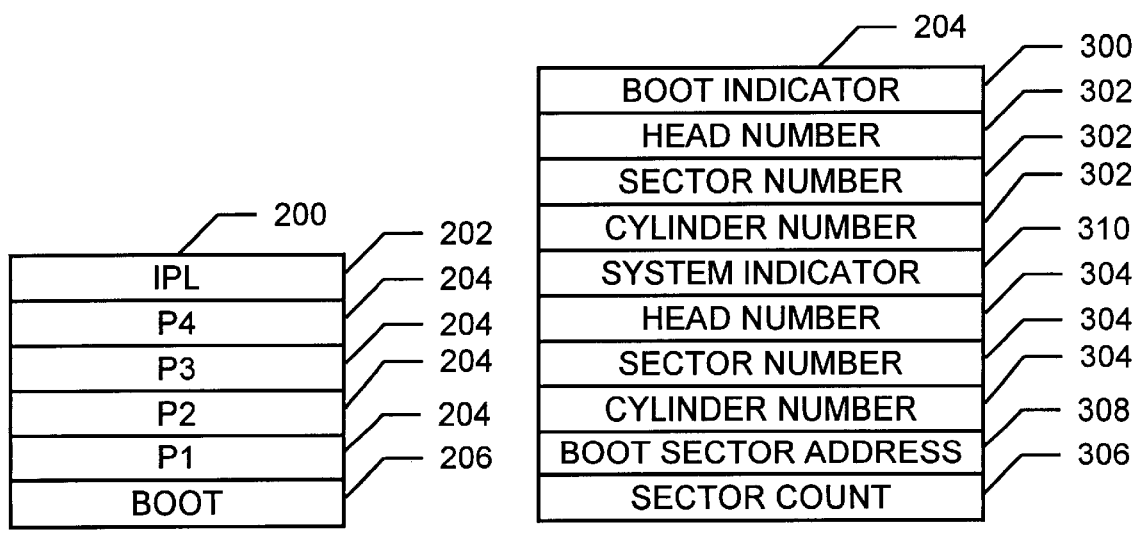
Fig. 2
Fig. 3

MERGING COMPUTER PARTITIONS

FIELD OF THE INVENTION

The present invention relates to manipulation of computer disk partitions without destroying user data, and more particularly to tools and techniques for merging computer disk partitions that contain user data organized by FAT, NTFS, or similar file systems.

TECHNICAL BACKGROUND OF THE INVENTION

Computers utilize a wide variety of disks as storage media for user data. Disk technologies currently provide optical disks, magnetic disks, hard disks, floppy disks, and removable disks, and new disk technologies are being actively researched and developed. Indeed, some disks used by computers in the future may be cubical or some other shape rather than flat and circular. Investigation into "disks" in the form of non-volatile semiconductor storage devices such as flash memory is also ongoing.

FIG. 1 illustrates a disk 100 attached to a disk drive 102. The disk 100 illustrates physical characteristics of both floppies and hard disks; cubical disks or other disks may appear in different configurations than the one shown here. The disk 100 contains a number of concentric data cylinders such as the cylinder 104. The cylinder 104 contains several data sectors, including sectors 106 and 108. The sectors 106 and 108 are located on an upper side 110 of the disk 100; additional sectors may be located on a lower side 112 of the disk 100. The sides 110, 112 of the disk 100 define a platter 114. A hard disk may contain several platters. The upper side 110 of the disk 100 is accessed by a head 116 mounted on an arm 118 secured to the drive 102. Optical or cubical disks may be accessed by other means, such as photoemitters or photoreceptors.

A given sector on the disk 100 may be identified by specifying a head, a cylinder, and a sector within the cylinder. A triplet specifying the head number, cylinder number, and sector number in this manner is known as a "physical sector address." Alternatively, a given sector may be identified by a logical sector address, which is a single number rather than a triplet of numbers.

An operating system manages access, not only to the disk 100, but to other computer resources as well. Resources typically managed by the operating system include one or more disks and disk drives, memory (RAM and/or ROM), microprocessors, and I/O devices such as a keyboard, mouse, screen, printer, tape drive, modem, serial port, parallel port, or network port.

Many disks mold the available space into one or more partitions by using a partition table located on the disk. A wide variety of partitions are used, and more partition types will no doubt be defined over time. A partial list of current partitions and their associated file systems is given in U.S. Pat. No. 5,930,831 and incorporated here by reference. The list includes a variety of 12-bit, 16-bit, and 32-bit FAT file systems and numerous other file systems. Tools and techniques for manipulating FAT partitions and certain other partitions are described in U.S. Pat. Nos. 5,675,769, 5,706, 472 and 5,930,831 assigned to PowerQuest Corporation, incorporated herein by this reference.

The NT File System ("NTFS") system provide useful features not available under many existing FAT file systems. Discussions of NTFS are provided in "Inside the Windows NT File System", by Helen Custer, ISBN 1-55615-660-X, and "Inside Windows NT" (Second Edition), by David A. Solomon, ISBN 1-57231-677-2, as well as in marketing and technical materials available in hard copy and on the Internet from Microsoft Corporation and other sources.

Some computer systems, such as many using NetWare FS or NTFS, mold disk storage into "segmented partitions" or "segmented volumes" with an approach somewhat different from that noted above. Segmented partitions are most often used in connection with file systems such as the Novell NetWare file system (NetWare is a mark of Novell), but may also be used with DOS (i.e., FAT) file systems and NTFS. The NetWare file system and related partition structures are discussed in U.S. Pat. No. 5,907,672; that discussion is incorporated herein. The NetWare file system is also discussed in marketing and technical materials available in hard copy and on the Internet from Novell and other sources.

On segmented systems, a "volume" is an instance of a file system. Hard drives may be divided into partitions, and volumes may be divided into "segments". A "segmented volume" is a volume which does or can contain segments, i.e., a segmentable volume. A "segmented partition" is a partition which does or can contain segments, i.e., a segmentable partition. For instance, a type 06 partition is not a segmented partition. A given partition may hold zero or more segments from zero or more volumes which are instances of one or more file systems; the cases of primary interest here are those in which one or more segments from one or more volumes are present.

The file system structures on disk do not necessarily reflect the presence of segments. Some NetWare FS structures can define the location and/or extent of segments, for example, but structures manipulated by NTFS routines do not ordinarily define segment extent or location. Segments may be created with conventional tools in order to improve response times or to provide fault tolerance. For example, in a Microsoft Windows NT environment, the Disk Administrator tool can be used to set up an NTFS volume that spans multiple disk drives. A NetWare partition is a section of a disk which is allocated to NetWare by a partition table. NetWare partitions may not span disks. Segmented partitions in other environments may be subject to the same or similar requirements. Although specific definitions of "disk" and "drive" are given herein, those of skill in the art will recognize that these terms are sometimes used interchangeably when the distinction between the media and the controller/drive mechanism is not important.

One partition table composition, denoted herein as the "IBM-compatible" partition table, which includes both the FAT file system and NTFS, is found on the disks used in many IBM® personal computers and IBM-compatible computers (IBM is a registered trademark of International Business Machines). Although IBM is not the only present source of personal computers, server computers, and computer operating systems and/or file system software, the term "IBM-compatible" is widely used in the industry to distinguish certain computer systems from other computer systems such as Macintosh computer systems produced by Apple (Macintosh is a mark of Apple Computer). IBM-compatible partition tables may be used on a wide variety of disks, with a variety of partition and file system types, in a variety of ways. They are generally used on 80x86 or Pentium-based architectures (Pentium is a mark of Intel), but may be used on computers with other CPU types.

As shown in FIG. 2, an IBM-compatible partition table 200 includes an Initial Program Loader ("IPL") identifier 202, four primary partition identifiers 204, and a boot identifier 206. As shown in FIG. 3, each partition identifier 204 includes a boot indicator 300 to indicate whether the partition in question is bootable. At most one of the partitions in the set of partitions defined by the partition table 200 is bootable at any given time. Some IBM-compatible computer systems allow "logical partitions" as well as primary partitions. All logical partitions are contained within one primary partition; a primary partition which contains logical partitions is known as an "extended partition."

Each partition identifier 204 also includes a starting address 302 which is the physical sector address of the first sector in the partition in question, and an ending address 304 which is the physical sector address of the last of the last sector in the partition. The start of a partition is sometimes referred to as the "left edge" or "beginning" and the end of the partition is sometimes referred to as the "right edge" or "ending" of the partition. A boot sector address 308 typically holds the logical sector address corresponding to the physical starting address 302.

Each partition identifier 204 also includes a system indicator 310. The system indicator 310 identifies the type of file system contained in the partition, which in turn defines the physical arrangement of user data and system data that is stored in the partition on the disk 100. Values not recognized by a particular operating system are treated as designating an unknown file system. The file system associated with a specific partition of the disk 100 determines the format in which data is stored in the partition, namely, the physical arrangement of user data and of file system structures in the portion of the disk 100 that is delimited by the starting address 302 and the ending address 304 of the partition in question. At any given time, each partition generally contains at most one type of file system, but a segmented partition may contain segments of different file systems.

It is sometimes desirable to combine two or more partitions on a computer disk by subsuming one or more partitions into another partition. The user data formerly found in the various partitions is now found in the resulting partition, and the subsumed partitions no longer exist (at least, they are not defined in the partition table 200 or in analogous volume definition tables in segmented partition systems).

A conventional approach to combining partitions begins by copying all necessary user and system data off the disk to a temporary storage location such as a tape or additional disk(s). The data copied includes without limitation the contents of files created by the user such as textual documents and spreadsheets (user data), the contents of files required to run applications such as word processors (more user data), and system data such as file system directory information, file allocation tables, and bad sector lists. Some internal file system data such as sector allocation maps may not need to be copied, but are often copied anyway. Familiar disk utilities such as FDISK, the install.nlm and nwconfig.nlm utilities in NetWare that manipulate partitions and volumes, and formatting utilities are then used to delete the partitions which are being subsumed and to increase the size of the result partition (thereby destroying some or all of the user data on the disk). Alternately, a tool such as the PowerQuest PartitionMagic or ServerMagic product can be used to resize the result partition once room is made available by removing the partitions which are being subsumed (PartitionMagic and ServerMagic are marks of PowerQuest). Finally, the data is copied back into the enlarged result partition. During the copying process the file system copy or restore utility creates appropriate new file system structures in the result reflecting the locations of copied data on the disk.

This approach to partition combination has several drawbacks. A temporary storage device with adequate storage capacity may not be readily available or affordable under the circumstances. Even if temporary storage is available, copying large amounts of data from the disk to temporary storage and then back again can take a substantial period of time. In addition, combining partitions in this manner is confusing and dangerous for many computer users. Users who are unfamiliar with the numerous technical details required as input to the conventional utilities may easily and inadvertently destroy data and/or make it necessary to further modify the disks with FDISK and/or other tools again, to reformat again, and to once again copy all the data from temporary storage into the reformatted partition. Even if everything works as desired the first time and FDISK is avoided in favor of a friendlier tool, combining partitions this way can be very time-consuming. With a typical disk holding several gigabytes of data the process may require several hours to complete successfully.

If the result partition has enough free space to accommodate the user data of the other partitions, or can be resized without removing all the other partitions, then some or all of the steps in resizing the result, backing up the user data, and restoring that user data into the result, can be skipped. But in many cases, the result will not have enough free space, with or without resizing. Moreover, copying user data from one partition to another can be time-consuming even if the data does not travel to and from tape during the copy.

Thus, it would be an advancement in the art to provide improved tools and techniques for combining partitions, including partitions that contain user data organized by FAT, NTFS, NetWare, or similar file systems.

Such improved tools and techniques are disclosed and claimed herein.

BRIEF SUMMARY OF THE INVENTION

The present invention provides tools and techniques for merging two or more adjacent partitions. The surviving partition is called the target partition. The other selected partition(s) are called secondary partitions. Features of one or more embodiments of the invention are summarized below; "embodiment" refers to any system, method, signal, or configured medium according to the invention.

Two or more adjoining partitions may be combined. Primary and logical partitions may be combined. During merging partitions may have their clusters aligned and/or resized. The target partition may also have a different partition type than one or more of the original partitions, as when a FAT16 partition is merged into a FAT32 partition. The merging preserves user data and places system data where the file system expects it to be. The system data may not be in the same location as if the partitions had been combined by conventional means, but it will properly describe the same user data, so that tools such as CHKDSK and VREPAIR will not complain.

If the clusters of the target and secondary partition(s) are not aligned then the non-conforming clusters will be realigned. During both resizing and realigning steps, the system data in the target partition is modified as necessary, but the user data in selected partitions is moved as little as possible. Thus, even if a target partition could be resized with PartitionMagic software or some similar tool and user data could be copied into the target partition without going to tape, the present invention permits a faster approach because it can grow the target around the user data without moving that data. In at least some cases, this makes it unnecessary to copy the user data at all.

When user data is relocated, as for example, during some cluster resizing and realigning steps, the user data may be copied from its original location directly to its final location without the need of a temporary location, or it may be copied to a safe temporary location on the disk. It is then copied from the temporary location into its final destination. Either way, this preserves a copy of the user data on the disk at all times, thereby minimizing the risk of losing user data during an interruption. Progress markers may be stored on the disk or in battery-backed memory, allowing operations to be restarted from the last completed step if an interruption occurs.

If an interruption occurs before the original partition system data is deleted, the original partitions can be restored. For instance, a user may cancel a merge right up to the point at which the original target or secondary partition system data is gone. If an interruption occurs, through an electrical power failure or other means, then the merged partition can be recovered. During the merge, at least one copy of all system data of all involved partitions may be kept on the disk, thereby reducing the risk of loss of system data.

In short, partition merges are performed in a manner which is flexible, safe, and efficient. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings:

FIG. 1 is a partial cut-away view of a computer disk.

FIG. 2 is a diagram illustrating an IBM-compatible partition table.

FIG. 3 is a diagram further illustrating part of the partition table shown in FIG. 2.

DETAILED DESCRIPTION OF THE PREFERRED EMBODIMENTS

Figure 4:
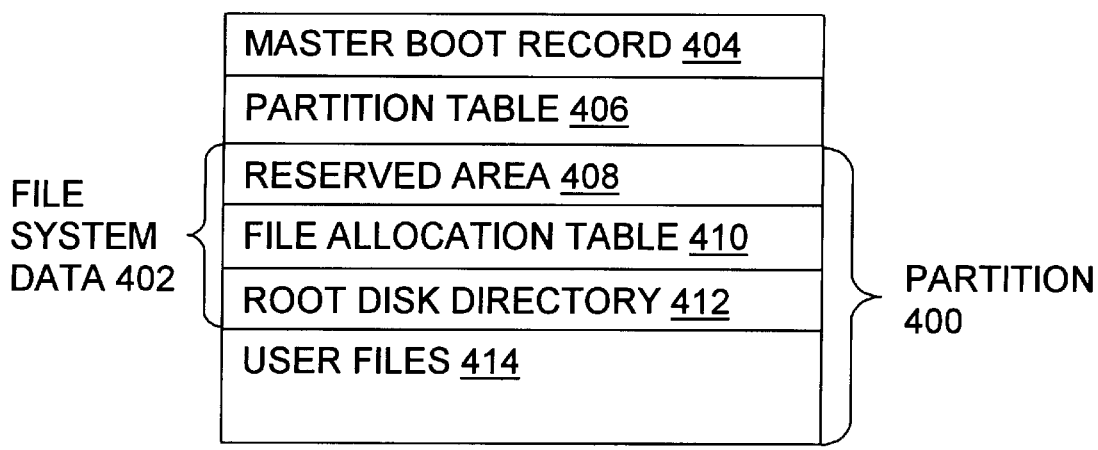
FIG. 4 is a diagram illustrating some features of a FAT partition.

The present invention relates to computer systems, methods, signals or data carriers, and configured storage media for merging computer partitions. Partitions are merged by moving one edge of a target partition to overlap one or more neighboring secondary partitions and modifying or otherwise providing file system data structures in the merged partition to organize and retain the user data of all involved partitions. User data is copied as little as necessary, and in many cases is left in its original location on the disk instead of being copied during the merge. The boot record, partition table, volume definition table, and/or similar system structures are also updated to reflect the changes to the target partition and the removal of secondary partition(s).

Computers and Networks Generally

The invention may be used on standalone computers or on computers in a network. The network may be connectable to other networks, including LANs or WANs or portions of the Internet or an intranet, through a gateway or similar mechanism, thereby forming a larger a network which is also suitable for use according to the invention. One suitable network includes a server connected by communication links or network signal lines to one or more network clients. Other suitable networks include multi-server networks and peer-to-peer networks. The server(s) and client(s) in a particular network according to the invention may be uniprocessor, multiprocessor, or clustered processor machines. The server(s) and client(s) each include an addressable storage medium such as random access memory.

Suitable network clients include, without limitation, personal computers; laptops, personal digital assistants, and other mobile devices; and workstations. The signal lines may include twisted pair, coaxial, or optical fiber cables, telephone lines, satellites, microwave relays, modulated AC power lines, RF connections, a network link, a dial-up link, a portable link such as an infrared link, and/or other data transmission "wires" or communication links known to those of skill in the art. The links may embody conventional or novel signals, and in particular, may embody a novel series of commands and/or data structures for merging partitions as discussed herein.

Booting, System Structures, and Partitions

In a hierarchy of system structures used to organize user data on IBM-compatible (e.g., "Wintel" or "Intel-based" or "Windows") computers, one finds at or near the top a master boot record and an IBM-compatible partition table, which define the way a disk is organized. For instance, a Master Boot Record (MBR) 404, illustrated in FIGS. 4 and 5, normally resides on the first sector of a disk. The MBR 404 refers to a partition table 406 to determine which partition to use when booting the computer. The MBR 404 also includes a program that reads the boot sector record of the boot partition into RAM. In turn, that program loads the rest of the operating system into RAM.

The partition table 406 defines how many partitions the hard disk is formatted into, the size of each partition, and the addresses where each partition begins; defining the partition's starting and ending addresses is equivalent to defining the starting address and the size. Each IBM-compatible partition table can presently define up to four partitions. These can be four primary partitions or three primary partitions and one extended partition. The extended partition can be divided into logical partitions. Each of the partitions has a left edge (start) and a right edge (end) defined in the partition identifier, as shown in FIG. 3. The left edge is defined by the first sector address 302, and the right edge is defined by the last sector address 304.

The MBR 404 may identify (by location and size) an extended partition, but the MBR has no information about the logical volumes. Without special software, neither an extended partition nor any of its volumes are bootable. An operating system can be installed on a logical volume, but it cannot be booted directly from the MBR; special boot management software such as PowerQuest's BootMagic product must be used (BootMagic is a mark of PowerQuest).

The order of the partition definition entries in the MBR 404 does not necessarily correspond to their physical location on the hard disk 100. A primary partition cannot be placed between two logical partitions that belong to the same extended partition, because that would imply that a primary partition lies within an extended partition.

FAT File Systems

FAT file systems were initially used by the DOS operating system and are also used by systems running Microsoft Windows 3.x, Windows 95, Windows 98, and Windows 2000 environments. FAT file systems include 12-bit FAT, 16-bit FAT, and 32-bit FAT file systems. The discussion herein is only an overview of FAT features; it is not meant to be exhaustive.

FIG. 4 shows a FAT partition 400, that is, a partition containing user data that is organized according to one of the FAT file systems. A FAT file system normally places file system data 402 at or near the left edge of the partition; user data 414 and available space (if any) take up the rest of the partition 400. The FAT file system data 402 in a target partition is modified when two or more FAT partitions are merged.

The file system data 402 includes at least a reserved area 408, a file allocation table 410, and a root disk directory 412. The reserved area 408 (also referred to as the volume boot sector or boot file) contains information about the physical characteristics of the partition, such as cluster size, sectors per track, and how to physically boot the partition. Some definitions put the file allocation table 410 inside the reserved area; for clarity, the two are shown separately in FIG. 4.

A sector is the smallest unit of accessible storage on a disk; sectors often contain 512 bytes of data but in some parts of the world 1024-byte sectors are used. A disk is formatted into tracks and sectors. A track is a concentric circle around the disk, while a sector is a segment or arc within each circle. Information can be accessed through its track and sector number. A cluster is a group of sectors; the cluster size indicates how many sectors are used per cluster. Each cluster is numbered sequentially. A specific area of the disk can be accessed by knowing the number of sectors in a cluster (the cluster size) and the cluster number for the area. The file allocation table 410 helps store file locations by identifying the individual clusters that belong to each file.

A computer user often accesses files 414. Each file is a series of clusters (not necessarily sequential), with a name that identifies it. A file contains some type of computer-encoded data: program code, data, pictures, a movie, sound, and so on are common examples. Each file 414 has its own entries in the file allocation table 410. The file allocation table 410, which is stored in the area of the disk immediately following the reserved area 408, identifies the locations on disk of the clusters that make up each individual file in the partition. For each file 414, an entry contains the number of the first cluster assigned to that file. Successive entries describe the successive clusters that make up the file, up to some last cluster. If a file is bigger than the cluster size it will be assigned two or more separate clusters which need not be contiguous. When a file 414 is read, the operating system adjoins user data from the file 414 using the cluster entries in the file allocation table 410, to provide a continuous stream of user data 414.

Files are stored using a directory structure known as a directory tree. The base of the tree is known as the "root" directory. This is the starting point from which all other directories branch out. There can only be one root directory 412 for any FAT partition (however, some partitions contain one or more copies of some file system data 402 for enhanced fault tolerance). The root directory 412 holds either files or other directories known as subdirectories. Each subdirectory itself holds files or other subdirectories, and so on.

The root disk directory 412 is stored in a fixed location on the disk and is a fixed size. It holds information about the root directory, and where the files and subdirectories below it are located. In some later implementations, subdirectories are also included in the root disk directory 412. The root directory is sometimes limited to a specific number of entries. The number of entries that the root directory can hold depends on the specific FAT implementation.

NTFS

Figure 5:
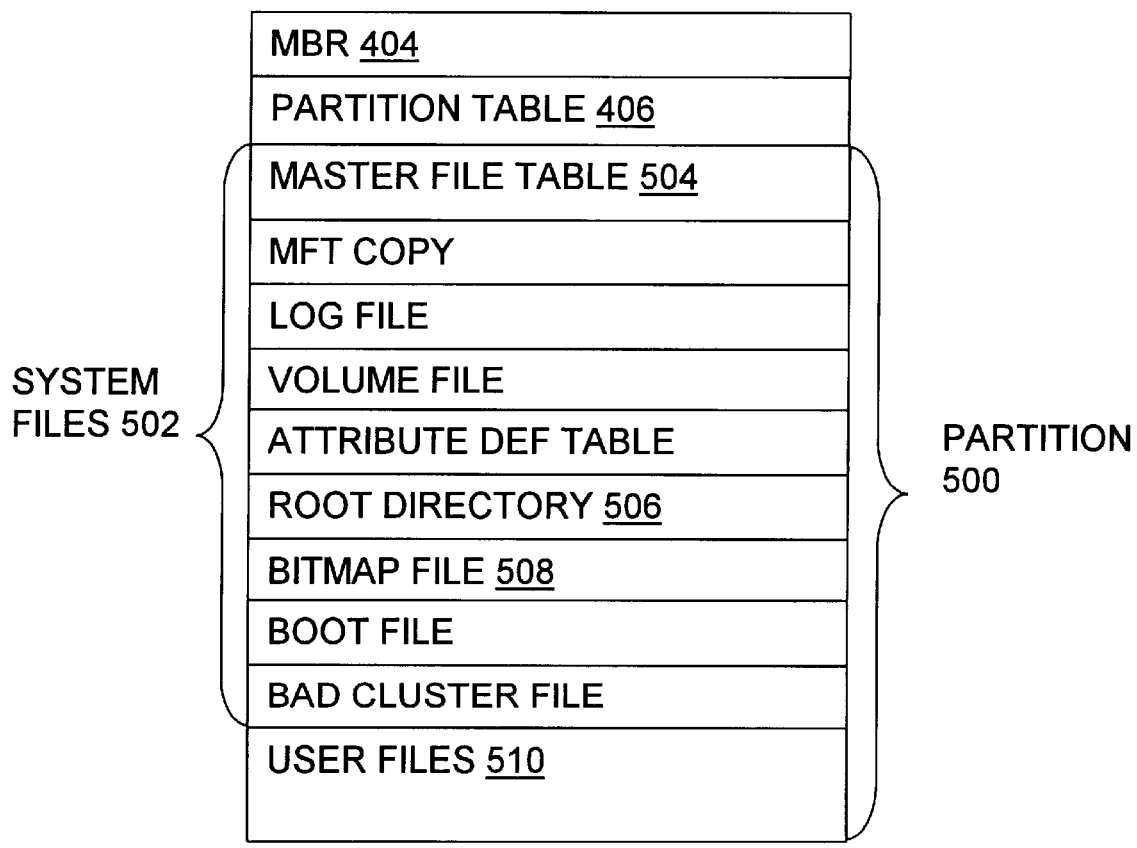
FIG. 5 is a diagram illustrating some features of an NTFS partition.

NTFS (short for NT File System) is the main file system for the Microsoft Windows NT operating system. The discussion below is merely an overview of NTFS features and is not meant to be exhaustive. As noted above, in a FAT partition the file system data 402 is stored at or near the start of the partition. By contrast, in an NTFS partition 500 the NTFS file system data is stored in system files 502 which can be located anywhere in the partition 500, but the first fifteen system files must be contiguous. Even though FIG. 5 shows the system files 502 in a particular order, the actual file locations are not constrained, and files may be in some other order with respect to a traversal of the partition 500 from start to end. The NTFS system files 502 of a target partition are modified when two or more NTFS partitions are merged.

A Master File Table (MFT) 504 is itself a file. This table 504 contains information about each file in the partition 500, including itself. The information in the MFT 504 is similar to the information in a FAT file allocation table 410 in that the MFT 504 contains cluster chains that specify the location of the contents of each user file 510. NTFS attempts to store all of the information in the Master File Table 504 in a contiguous block.

A Root Directory 506 file contains the "root" of the directory structure as used in the partition 500. Unlike FAT, NTFS allows more than one root directory.

A Bitmap file 508 contains a bitmap, each bit of which represents a single cluster on the partition 500. The state of each bit records the allocation of each cluster of the partition 500, showing whether it is free or allocated. Although the user files 510 are shown at the end of the system file block, those of skill in the art understand that in an NTFS partition the user files 510, long with the system files, are not constrained in location the way FAT user files 414 are constrained.

NetWare File System

Commonly owned copending application Ser. No. 09/374, 556 describes and claims tools and techniques for merging segments in a partition such as a NetWare partition (one organized at least in part according to the NetWare file system). By contrast, the present invention deals more specifically with the merging of partitions, not the merging of segments.

Apart from updating the non-volume related system structures in a NetWare partition, such as the volume definition tables and the redirection area tables, the resemblance between NetWare and FAT file systems can be used according to the present invention. For instance, the teachings herein of tools and techniques for manipulating FAT file allocation tables and FAT directories to merge FAT partitions can be readily applied by those of skill in the art to manipulate NetWare file allocation tables and NetWare directories to merge NetWare partitions when segments are not being used. In manipulating NetWare file allocation tables, one must recognize and properly handle suballocation, which permits a given cluster to contain data belonging to more than one file. In this situation (and others) clusters are sometimes referred to as "blocks" or "file system allocation units." Suballocation may be supported to reduce the amount of allocated space that is not actually being used to hold data, when relatively large blocks are being used. If a suballocated cluster needs to be resized, care is taken to correctly update the file allocation table or other file system structure that maps clusters to files. For example, suppose a suballocated cluster XY holds data from file XX and also holds data from file YY. If the cluster size is decreased, then clusters X and Y which are created from the larger cluster XY may each contain data from only one file. Of course, other new clusters may still contain data from more than one file, depending on the cluster sizes and data placement involved. If the cluster size is being increased, then suballocation may make it possible to avoid moving data to make room for cluster expansion. Instead of moving the data, changes are made in the file allocation table to correctly map the larger clusters to the files whose data they hold. For example, suppose cluster A holds data only from file AA and suppose cluster B, which is adjacent to cluster A, holds data only from file BB. Then increasing the cluster size may create a suballocated cluster AB from the two smaller clusters A and B, with cluster AB holding data from both file AA and file BB.

Generally, if segments are being used in all of the partitions being merged, then the merge need only manipulate the system data structures that define segments and partitions, such as partition tables and volume definition tables. Care is taken to ensure that volume definition tables, segment definitions, and the like are internally consistent and that they reflect target partition resizing and secondary partition removal. The file allocation tables and other file system structures inside segments of the selected partitions need not be manipulated; the file system data in the segments are insulated from the partition merge by virtue of being contained in their respective segments.

If a redirection area is present in the target and in any of the secondary partitions and there are redirected blocks in the secondary partition, then the redirected blocks must be copied from the secondary partition's redirection area to the target partition's redirection area. The system tables in the target redirection area must be updated to reflect the redirected blocks incorporated from the secondary partition. If redirected blocks exist in a secondary partition and there is no redirection area in the target partition (as can be the case in NetWare 5) then a minimum size redirection area must be created in the target partition so the redirected blocks can be moved there. In a worst case scenario, creating a minimum size redirection area may necessitate moving or resizing volume segments to gain enough free space at the beginning of the partition to create the redirection area.

Because NetWare limits the number of segments in a partition to eight, the target partition must contain no more than eight segments. Merging segments from a common volume may be performed, however, according to steps provided in patent application Ser. No. 09/374,556, to insure that the target partition is limited to eight segments.

To one of skill in the art, an analogy may be drawn between merging two actual segmented partitions and merging two hypothetical extended partitions—each manipulation leaves intact the structures which are nested inside the merging partitions. In the case of segmented partitions, the segments contained in the segmented partitions are left intact; only their surrounding containers merge. That is, merger reduces the number of partitions which contain the (unaffected) user data but does not change the number of segments unless segments were merged to insure that no more than eight segments existed in the target partition. In the hypothetical case of two adjacent extended partitions, the logical partitions contained in the extended partitions would be left intact; only their surrounding containers would merge. That is, merger would reduce the number of extended partitions without changing the number of logical partitions. The case involving two extended partitions is hypothetical because current systems only support one extended partition per IBM-compatible partition table, but the analogy is nonetheless instructive because extended partitions and logical partitions are well understood.

Methods Generally

Figure 6:
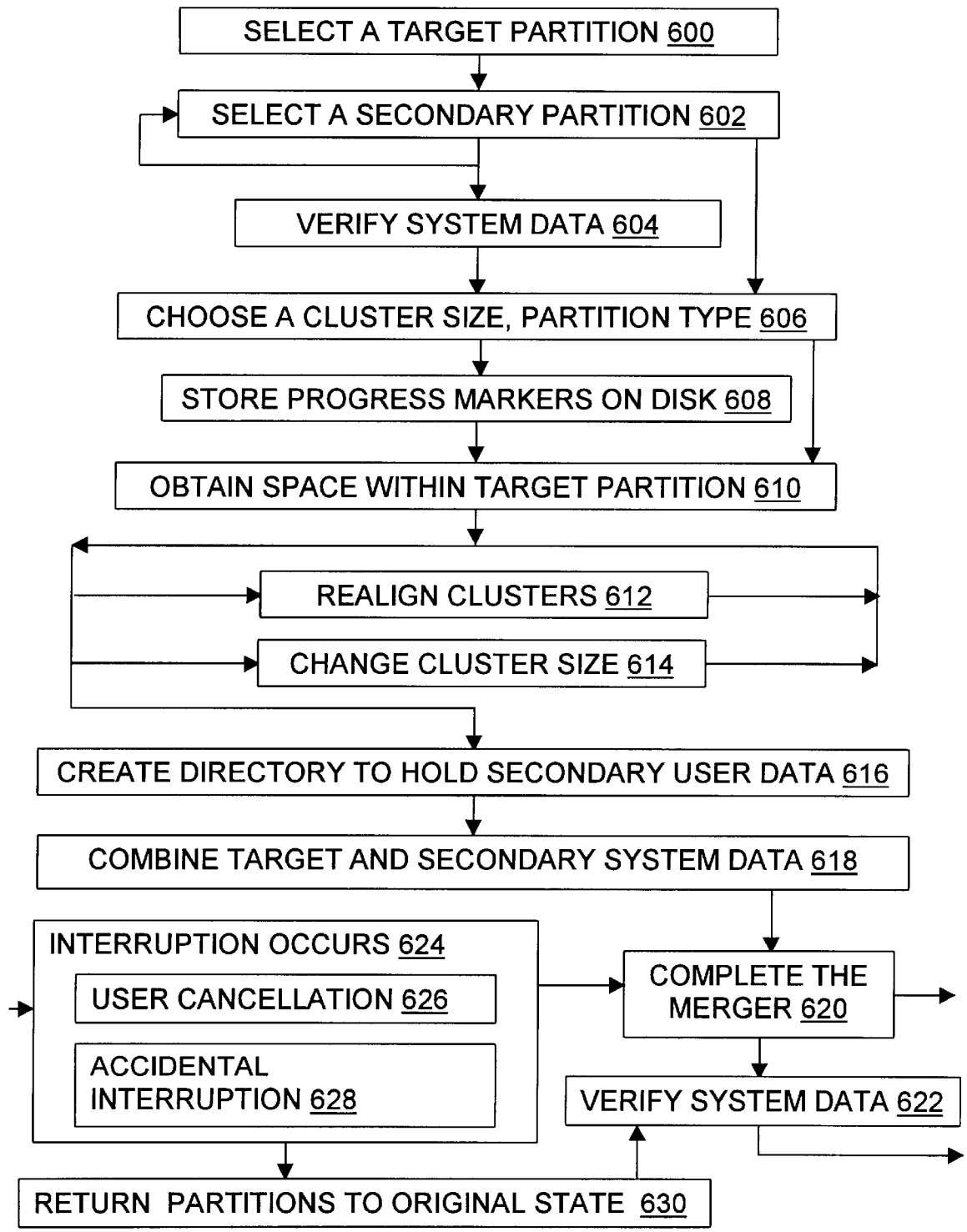
FIG. 6 is a flowchart illustrating methods according to the invention.

FIG. 6 illustrates methods of the present invention for merging partitions without destroying user data except at a user's request. During a target partition selecting step 600, one partition is selected to be the surviving partition after the merge. The selected partition will grow to include all the user data it started with plus all the user data of the partitions that are merged into it. Although user data is preserved, file allocation tables, MFTs, and other system structures will be modified. Target selection may be performed automatically by software, but is more commonly accomplished interactively by a human user using an interface such as a graphical user interface (GUI).

During a secondary partition selecting step 602, one or more partitions are selected to be merged into the target partition and thereby deleted (in the sense of providing fewer partitions with the same user data; the user data is not deleted unless the user asks that it be deleted). The secondary partitions must also be adjacent to the target partition and/or to another secondary partition.

"Adjacent" partitions may have intervening free space. An extended partition with free space may exist between two adjacent partitions. Adjacent partitions may be logical partitions within the same extended partition, or one may be a logical partition at the end of an extended partition while the other is a primary partition near the same end of the extended partition. Adjacent partitions may have EPBR's (Extended Partition Boot Records) between them, but they may not be separated by another intervening primary or logical partition. The method grows the target partition so it extends to the furthest boundary of any secondary partition; all of the partitionable storage medium thus covered must be either free space or space allocated to one of the selected (target or secondary) partitions. If the target partition is a FAT partition or another partition whose file system structures are near the left edge (start) of the partition, implementations may require that the target be the leftmost (lowest starting address) partition so that the target partition can be grown by moving its right edge (end) without necessarily moving all of its file system structures.

Figure 7:
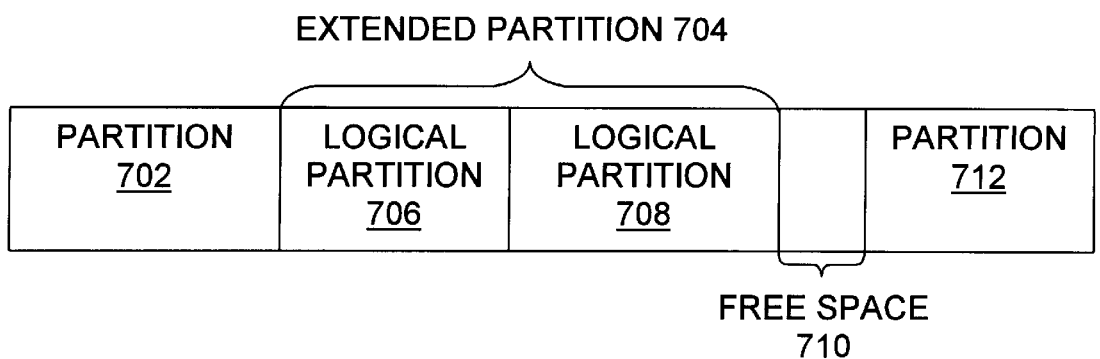
FIG. 7 is a diagram of disk partition configurations illustrating partition merger possibilities and constraints according to the invention.

An example of the many possible partition configurations is shown in FIG. 7. A partitionable storage medium such as disk 100 is divided by a partition table such as table 406 into a primary partition 702, an extended partition 704 containing two logical partitions 706 and 708, some free space 710, and another primary partition 712. Suppose a logical partition 706 has been selected as the target partition. Logical partition 708 can be selected as a secondary partition. Primary partition 712 could also be selected as a secondary partition to target partition 708 with the free space 710 between the partitions 708 and 712 thereby being included in the final merged partition.

If partitions 706, 708, and 712 are merged then the extended partition 704 could be removed, so the merged partition is a primary partition. Alternatively, the merged partition could be a logical partition, in which case the extended partition 704 could have its boundary changed to the right-hand boundary of current primary partition 712.

On the other hand, suppose partition 702 is the target partition. Then partition 708 cannot be chosen as the only secondary partition because partition 706 is between partition 708 and the desired target partition 702. That is, partitions 702 and 708 are not adjacent.

NFTS permits multiple boot partitions using primary and logical partitions. If more than one selected partition is bootable, the surviving target partition preferably becomes the bootable merged partition. Any entries for the other selected partition(s) in the boot.ini file are removed. The boot sector in the target partition is also updated so that its sector count matches the sector count of the new merged partition.

Some embodiments refuse user requests to merge two primary partitions, because each primary partition could contain an operating system and the merge could prevent one or both of the operating systems from functioning properly. In general, users will want to merge a data partition with either another data partition or with an operating system partition. Alternate embodiments allow any combination of adjacent logical and/or primary partitions to be merged but warn users about the risk of "breaking" an operating system partition when multiple primary partitions or multiple operating system partitions are detected. Tools and techniques used in boot management products such as PowerQuest's BootMagic product (mark of PowerQuest) can be used to detect operating systems in partitions.

An optional verifying step 604 is preferably performed after the selecting steps 600, 602 to check the internal consistency and integrity of system structures in the selected partitions. Suitable verifying steps include steps performed by commonly used tools such as CHKDSK and SCANDISK (in DOS and Microsoft Windows environments) which can check for errors such as disk media defects and lost clusters, and which can also fix at least some of them. The verifying step 604 preferably checks the internal consistency of all redundant copies of system information, in addition to checking the integrity of the computer disk in other ways. In some implementations the merge will instantly halt if disk errors are found. Other implementations give a user the chance to run a program such as CHKDSK to fix the errors. Some implementations allow the user to change the selection of partitions to merge. In the preferred implementation, if the merge must be stopped an error message is given and the program is halted gracefully.

The verifying step can be performed at one or more different points. For instance, verification can be done after a realign clusters step 612, after a change cluster size step 614, and at other points. For clarity of illustration, the verifying step is only shown twice in FIG. 6, at a point prior to the merge 604 and again at a point after the merge 620.

The merged partition may have a cluster size and/or a partition type different than that of one or more of the selected partitions. The user or the system may choose the desired cluster size and partition type during a step 606. Selection of cluster size is limited by the file system type and merged partition size, in a manner well understood in the art; see, e.g., Table 1 in U.S. Pat. No. 5,706,472. In addition, file system conversion techniques known in the art for use without partition merging can be applied in combination with the teachings herein to convert file system types in a limited manner during or after partition merging. For instance, one or more of the selected partitions may be a FAT16 partition while the merged partition is ultimately a FAT32 partition or an NTFS partition.

If a cluster size and partition type are not chosen by the user during a particular instance of step 606, then the implementing program may use default choices set by the user (at program installation or perhaps at some other time), or default choices set by the programmer(s) who wrote the program that implements the invention. In particular, and without limitation, default choices may specify that the target partition type be used, that the target partition cluster size be used, that the smallest cluster size of any selected partition be used, and/or that the partition type of the first bootable partition be used. In a given situation, the implementing program could also use the cluster size that ensures the most free space on the disk. The most "advanced" partition type on the selected partitions may be chosen, where FAT 32 is more "advanced" than FAT 16, and NTFS is more "advanced" than FAT16 or FAT32. Other factors, such as which operating system(s) is/are present and which partition types are visible from different operating systems could also be considered. Preference could also be given to leaving the partition type unchanged, so the resulting (merged) partition has the same type as the target partition. Other methods, inventive or conventional, may also be used to choose the cluster size and/or partition type.

During a step 608, progress markers will be stored on the disk. This is shown as a separate step, but is implemented by updating the progress markers at milestones during the other illustrated steps. For instance, progress marker values may be stored after cluster size is chosen during step 606, during cluster realignment during step 612, before and after cluster size changes during step 614, and so on. In the case of an interruption, the merge operation can be restarted midway by using the progress markers to determine what has already been done and what state the selected partitions are in. In some implementations, as data is moved it may be initially copied into a temporary storage area, and then copied into its final location so in case of interruption, no data is lost. After the data is successfully copied, the data is written into the new cluster, the appropriate system changes are made, and the copied data can be overwritten by the next moving data.

Some embodiments combine user data archival to another medium, user data compression, user data encryption, and/or user data deletion with the partition merge, at least from the user's point of view. Such operations will normally be implemented internally to the implementing program as separate routines or functions. For instance, the user may request that certain files be deleted from a secondary partition before the user data of that secondary partition is merged with the user data of a target partition. This is not considered user data destruction, since it was not due to power loss, reliance on conventional backup and restore with FDISK, bad programming, or a design error, but rather reflects the user's wishes.

The inventive method preferably ensures that either the original or an unchanged copy of the system data of all selected partitions is on the disk at all times until a merger completing step 620. During that step the secondary partition system data is incorporated into the target system data, as explained herein.

To avoid modifying any files before it is absolutely necessary, the merge of the secondary partition's system data into the target partition's file system may be done into a temporary set of system files/system data on the target partition. During a step 610, the implementing program obtains space within target partition large enough to create these temporary system files. The amount of space to obtain is computed by taking the amount of space needed by the target partition's file system structures and adding that to the total size of the secondary partitions' file system structures; one may round up to reflect larger cluster sizes in the target partition if necessary. If the target partition has available space equal or greater to this size, the merge of the partitions' file systems will preferably be done into a temporary set of system files stored in the available free space.

If there is not available free space for the temporary copy of the combined system structures, then the merge may be disallowed. In one embodiment, the user is given the option of deleting data to make enough room. In another embodiment, the user is given the option of moving data from the target and/or secondary partitions to a non-selected partition to free enough space. If enough free space is not found, the user will preferably be informed of the problem, and the merge code will be preferably be exited gracefully.

If the merged partition is to be a FAT partition, then the left-most partition is preferably considered the target partition because the merged FAT partition always places the combined system data on the left-hand side (near the start of the merged partition). The current system structures in the left-most partition will be expanded to meet the requirements of the merged partition. If the file type is FAT32 then enough area must be cleared adjacent to the current system structures to hold the larger file allocation table. If the file type is FAT16 or FAT12 then enough area must be cleared adjacent to the current system structures to hold system data derived from both the file allocation table and the root directories of the selected partitions.

In the preferred FAT implementation the amount of system space to be cleared is equal to the difference between the size of the merged partition's system area and the size of the leftmost selected partition's system area. The merged system data can be created in memory and then laid down in its entirety in the system data area during step 620, thereby covering the leftmost selected partition's system data area plus the cleared area (if any) after it. The amount of space to be cleared for the system area (under FAT or NTFS) depends on the file system parameters of the resulting merged partition. Note that the target partition is not necessarily the leftmost selected partition. Also, if the leftmost partition is a non-notched primary partition and the right partition is the target and is a logical partition, then the left partition needs to be notched to match the right (target) partition before calculating the system area requirements.

In NTFS systems, the space to be obtained during step 610 must be equal in size to the system files of the target partition added to the system files of all secondary partitions. The necessary space must be present on the target partition, preferably in a contiguous block. If there is not enough free space on the target partition for the extra system files, the merge may not continue. In some implementations the merge will instantly halt, while other implementations will give a user the chance to select another partition as the target partition, or give the user a chance to free the necessary file space, or both. If the merge cannot be continued then the implementing program preferably exits gracefully after informing the user of the problem.

After verifying that sufficient space exists to store a temporary copy of the system structures, the selected partitions are checked for alignment. In some cases two or more selected partitions may not have the same cluster alignment relative to one another. This will result in the need to realign one or more partition's entire data during a step 612. This realignment is done in a way that preserves data if there is a power failure during realignment so that the merge function can either be restarted and continued to completion, or the partitions can be returned to their original states. If the merge cannot be continued then the program preferably exits gracefully, after informing the user of the problem.

Figure 8:
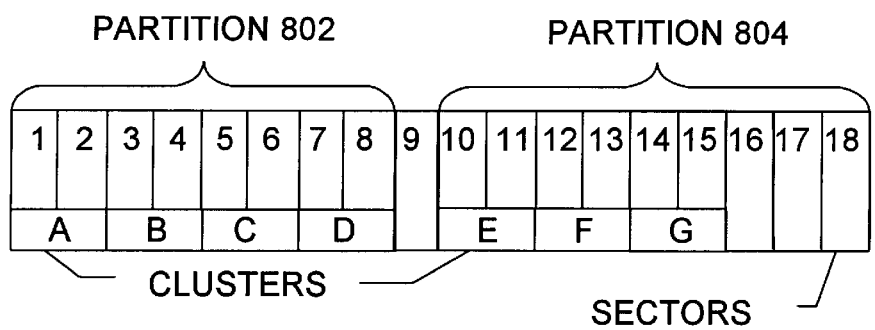
FIGS. 8 and 9 are diagrams of clusters and sectors within partitions illustrating manipulations according to the invention.
Figure 9:
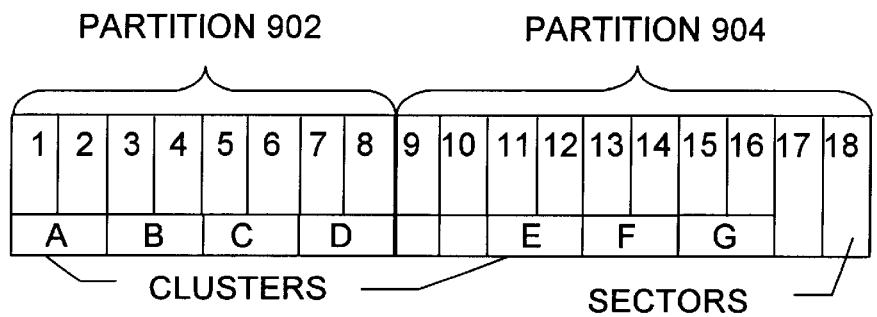

FIGS. 8 and 9 demonstrate partition realignment during step 612. The two figures are presented to demonstrate unaligned clusters, so some features of actual partitions are not shown. Furthermore, the examples shown have only enough clusters to illustrate the realignment; an actual partition normally has more than three clusters.

Sectors are the minimum amount of addressable space on a disk; in many systems, a sector holds 512 bytes of data but in some countries 1024 byte sectors are used. Each cluster in a given partition is defined as a certain number of sectors. Clusters on partitions to be merged must align, that is, they must start on the same sector address modulo the cluster size. If cluster size is four, then a new cluster starts every four sectors; if cluster size is eight, a new cluster starts every eight sectors, and so on. For example, in FIG. 8 cluster A of partition 802 starts on sector 1 and is two sectors long. All of the clusters in partition 802 therefore start on odd sector addresses. The first cluster of partition 804, cluster E, starts on an even sector address with sector 10. Therefore all clusters in partition 804 start on even addresses. If partitions 802 and 804 were to be merged without modifying any cluster locations, using partition 802 as the target partition, then cluster E would be incorrectly assumed to cover sectors 9 and 10; cluster F would be incorrectly assumed to cover sectors 11 and 12, and so forth. This would corrupt at least some of the data in partition 804 and hence could destroy user data that should have been preserved in the merged partition.

To realign the clusters during step 612, one implementation of the method determines which partition contains the most data. This becomes the partition to which the other partitions will be aligned. This choice of prevailing alignment does not necessarily correspond to the largest partition, since a smaller capacity partition may have more user data stored in it than a larger partition which is not filled to capacity. In FIG. 8, partition 804 is larger but partition 802 has more user data, so partition 804 will be realigned to partition 802 as shown in FIG. 9.

In one implementation, each cluster which is to be realigned is shifted to the right (to a higher address) to a new location having the correct alignment. Reserved sectors are padded to complete the shift. The shifting algorithm first clears any data from the last clusters of the partition and shifts the data only once, to a location beyond the top of the current block being moved, and marks the original location. This preserves at least one copy of the data on the disk so if the procedure is interrupted, no data is lost. If sufficient free space exists or can be obtained, data may also be copied directly to a new location which has the correct alignment and which does not overlap the original location; this is often faster than copying to temporary storage and still preserves at least one copy of the data on the disk during the realignment procedure. In another implementation, data is shifted left to align clusters, the system structures are shifted right, and the reserved sectors are padded.

In some cases, the realigning step 612 simply makes the cluster size on all selected partitions the same as the sector size. As all cluster boundaries are now sector boundaries, the clusters are, by definition, realigned.

During an optional cluster resizing step 614, the cluster size of at least one partition is changed. Cluster size may be changed for various reasons, including without limitation those identified here. One implementation requires that the clusters of all selected partitions be the same size before the merge, so partitions with different cluster sizes must have their cluster sizes equalized. The user may also select a different cluster size during step 606; all non-conforming partitions will have their cluster size changed to that size. If no cluster size is chosen, but merging partitions contain more than one cluster size, then one implementation chooses the smallest cluster size on any of the selected partitions as the merged partition's new cluster size.

When the cluster size is changed, the boot sector must have its value for the cluster size changed. The master file table (for NTFS) or the file allocation table (for FAT file systems) must have each cluster reference updated (at a minimum) to reflect the new data configuration. For example, if the old cluster size was four sectors and the new cluster size is two sectors, then the starting cluster in each file must be divided by two. The cluster count must also be incremented. Cluster resizing in FAT file systems is discussed in U.S. Pat. Nos. 5,675,769 and 5,706,472, incorporated herein by this reference. Resizing of suballocated clusters is discussed above.

To avoid problems with file or directory name conflicts when merging the file systems, a new directory is created in the root directory of the target partition for each secondary partition during a step 616. In some implementations, the new directory name is specified by a user using a graphical user interface or other interface. In other implementations default directory names are used. In some implementations both choices are allowed, with the user choosing the defaults. Before this step, in some implementations, the file system on each selected partition is validated. If any partition has an error, then the merge will not be allowed.

When creating the merged partition's new file system a new set of directory entries will be created for storing the location of the target partition's files. A new set of directory entries will also be created to show the location of each secondary partition's files, even though the locations holding file data on disk do not necessarily change.

In one implementation each selected partition has a separate directory at the root level. In another implementation the target partition's directories remain in place relative to the root, and a single directory at the root level holds all secondary partition root subdirectories, each of which contains the directory structure of one of the secondary partitions. Other methods, inventive and known by those in the programming arts can also be used to determine the final directory structure.

If one of the selected partitions uses FAT12 or FAT16 then the root directories of each of the secondary partitions must be converted to a dynamic directory because it will become a subdirectory of the root directory on the target partition. A dynamic directory is a file chain which can grow rather than having its size specified in the boot record as a static directory. The target may also need to have its root directory converted to a dynamic directory if the target partition is FAT12 or FAT16 and the merged partition type is FAT32.

A step 618 combines target and secondary system data. Information in the system data structures and/or system files of the target and secondary partitions is consolidated and the user data organized by the system data becomes user data of the merged partition. For merged partitions of type FAT, the data is merged in memory and is not yet laid down on disk, so the original system data is not overwritten until step 620.

For merged partitions of type NTFS, a temporary Master File Table (MFT) and other system files are created in the available free space on the target partition. None of the original system data is overwritten yet. This temporary MFT will eventually become the combined partition's working MFT. Preferably, no system data is destroyed during this step, so the merge can still be cancelled and the original partitions recovered prior to step 620.

In particular a temporary (MFT) is created by first copying the target partition's NFT to the temporary MFT so that it is a duplicate of the original MFT; recall that cluster size and cluster alignment may have been changed. The temporary MFT is then expanded to provide for a multiple of 64 files. The other system files, which include the log file, the volume file, and the bitmap file, are also copied into temporary versions. They are created with enough space to hold the target partition's system data plus all secondary partition system data. Creating the temporary versions allows the content of system files to be modified without thereby destroying any of the original system data.

An NTFS MFT contains a record for each file and directory on the NTFS partition, called the File Record Segment (FRS). The file record segment is a 64 bit value consisting of a sequence number followed by a file number. The sequence number is incremented for each succeeding file record, so the last file record segment in the MFT has the largest sequence number.

Each NTFS partition also has a volume bitmap file, which contains a bitmap aligned on 64-bit boundaries for each volume. Each MFT contains the volume name, the volume's version of NTFS, and a corruption bit, that when set, indicates that this volume has been corrupted.

The temporary MFT is expanded to align on a multiple of 64 bits. This allows the MFT bitmap and the volume bitmaps to be combined directly, since they are always allocated in 64-bit chunks. Otherwise the bits of subsequent MFTs might need to be aligned when combining them, analogous to the realignment discussed in connection with FIGS. 8 and 9. The data from the secondary partitions' MFT(s) will then be copied to the temporary MFT and all of the FRS sequence numbers for the secondary partition in the temporary MFT will be offset by a delta equal to the sequence number of the last FRS of the target partition. If more than one secondary partition is being merged in, then other offsets are added in a similar manner.

The new file records within the MFT have their starting cluster numbers updated to the original value plus the total size of the leftmost (e.g., target) partition and any intervening selected partitions as measured in clusters. Note that the size of the target partition is not necessarily the last cluster used in the target partition. This approach allows the secondary partition files to stay in their same positions on the disk (unless realignment is required during step 612). If more than one secondary partition is being merged, their cluster numbers are updated to be the original cluster value plus the total size of the target and any previously added secondary partitions.

The temporary bitmap file is then aligned on a 64 bit boundary. The system file area of the MFT is modified to reflect the expanded system files. The bitmap file from the first secondary partition is now appended to the temporary bitmap. The system data cluster bitmaps of the secondary file such as the master file table bitmap, the log file bitmap, the root directory, and so on, are now set to "unallocated" in the result partition. If more secondary partitions are merged, the same procedure is followed.

In a merger completion step 620, the final steps of the merger are completed. After this step begins the recovery of the original partitions can no longer be guaranteed by the implementing program. Of course, a tool such as the PowerQuest Drive Image product (mark of PowerQuest) may be used to create a pre-merge image of the partitions somewhere other than the disk space containing the selected partitions, and to then restore that image.

The target partition size is now expanded to include the space within the secondary partitions and any free space between, as discussed in connection with FIG. 7 and elsewhere herein. For NTFS merged partitions the boot sector and backup boot sectors are written to reflect the correct partition size, and they are set to point to the new Master File Table. The target MFT and system files are removed from the new bitmap file. The secondary partitions are deleted from the partition table. If a secondary partition was the first logical partition within an extended partition, then the original extended partition is resized smaller to delete the secondary partition table area.

The new directory for the secondary partition's files is added to the temporary root directory file. All the references to the secondary partition's original root directory are changed to the new directory. All other files and directories within the secondary partition(s) are sub-files or sub-directories of the root directory and so will not need their parent directories changed. All references to the original partition are changed to the target volume's partition.

For FAT partitions, a FAT merge completion performed during step 620 overwrites the leftmost selected partition's system area when it lays down the new boot sector(s), file allocation table, and directory structure for the resulting merged partition. Then, the secondary file system object is destroyed, as it is no longer needed. The in-memory file system object representing the target and secondary file system(s) is also destroyed. The partition table entries are updated. This includes deleting the secondary partition(s) from the on-disk partition table, and resizing an extended partition, if needed, to include or be clear of the merged partition, according to the logical or primary nature of the merged partition. The partition table entry for the target partition is resized to match the merged partition's location and extent. The partition type of the target partition table is also changed to the merged partition's type. If necessary, the Microsoft Windows registry partition number is updated.

In an optional verifying step 622, the resulting merged partition is checked to make sure that the process has completed correctly and that there are no file system errors resulting from the merge operation.

During an optional step 624, the merge operation is prematurely canceled or interrupted. During an optional user cancellation step 626, a user is allowed to stop the merge. In some implementations the user is allowed to cancel at any time. In other implementations, the user is allowed to cancel at predetermined points, such as before the cluster realigning step 612, after the data combining step 618, and so on. Some interruptions are accidental 628, such as when the computer system's power supply is interrupted, or when a hardware or software error results in a system crash, or a similar fatal event. As noted above, lack of necessary or desired storage space may also interrupt merging operations.

To avoid data loss, the implementing software preferably keeps a copy of system data in persistent storage (such as a hard disk) at all times. A copy of all user data is kept on the disk at all times. A recovery partition indicator may also be placed within the system indicator 310, in a manner similar to that described in U.S. Pat. Nos. 5,675,769 and 5,706,472.

In one embodiment, system files are written to disk in a fail-safe manner. For instance, a new updated copy of a file allocation table is written to disk in a different location than the old copy while the old copy is still on disk and is still referred to by the system files. When the new file allocation table is safely written to disk, the system file or other system structure that identifies the location of the file allocation table is updated to refer to the new file allocation table. After this, the new file allocation table is rewritten in its default location and the system files that refer to the file allocation table are again updated to refer to this final copy of the file allocation table. If a system failure occurs while the file allocation table is being written out to disk, the file system is still intact because the previous file allocation table is still referenced by the system data. This same approach applies to the other modified system data, and to MFTs.

During an optional step 630, the target and secondary partitions are restored their original state before the merge began. As selected partitions are kept intact up to the merger completion step 620, any errors during the merge that cause the in-process system files/data to be corrupted occur in memory or in an alternate copy placed on disk by the implementing program. Such errors thus do not corrupt the system data or user data of the original partitions. The user can therefore cancel the merge right up to step 620 and still return the target and secondary partitions to their original state. In an optional verification step, the restored partitions are checked to make sure that the process has restored them correctly and that there are no file system errors resulting from the merge operation. After the partitions are restored by step 630, the user is presented with an appropriate success message.

If an error occurs during the merger completion step 620 and the merged partition is to be of some FAT type, then the partition is left in an inaccessible state to the operating system but the temporary file allocation table object in memory is correct and the root file object in memory is also correct. If the target system data does not exist on disk and the copy in memory has been corrupted, then the partition may not be recoverable, although tools such as the PowerQuest Lost & Found product (mark of PowerQuest) may help recover user data.

One implementation therefore copies the combined system data file allocation table and root directory information into a permanent location, before finishing step 620, to ensure recovery of the merged partition. To complete the merge, the reserved area boot sector is copied and its values are adjusted to match the size in the temporary file allocation table. The file allocation table in memory is written to disk, the root file object is written to disk, the partition type is then changed in the partition table and the merge is completed successfully.

If an error occurs during the merger completion step 620 and the merged partition is of type NTFS, the partition is left in an inaccessible state to the operating system but the temporary MFT and the system files are correct. To complete the merge, the NTFS boot sector is copied and its values are adjusted to match the size in the temporary MFT. The boot sector is also updated to point to the new MFT. The partition type is then changed back to NTFS and the merge is completed successfully. After completion of the merge, the user is presented with a success message.

The method steps discussed above and elsewhere herein may be performed in various orders and/or concurrently, except in those cases in which the results of one step are required as input to another step. For instance, secondary partitions may be selected before the target partition is chosen, but the data combining step 618 must follow (at least) both selecting steps 600 and 602. Likewise, steps may be omitted unless called for in issued claims, regardless of whether they are expressly described as optional in this Detailed Description. Steps may also be repeated. For instance, verifying step 604 or progress marking step 608 may be repeated at different points. A change in the selection of partition, partition type, and/or cluster size may also necessitate the repetition of steps such as 610–618 during a given merge. Steps may also be combined (as shown in FIG. 6 with cluster size and partition choice, for instance), or named differently.

Configured Storage Media, Signals

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, flash memory, and other media readable by one or more of the computers. Each such medium tangibly embodies a program, functions, and/or instructions that are executable by the machines to perform partition merge method steps substantially as described herein, including without limitation methods which perform some or all of the steps illustrated in FIG. 6. To the extent permitted by law, programs which perform such methods are also within the scope of the invention.

The invention also provides novel signals which are used in or by such programs. The signals may be embodied in "wires", RAM, disk, or other storage media or data carriers. For instance, the invention provides a signal in which the partition starting address and ending address delimit a partition that contains not only its own system and user data but also the system and user data of at least one other partition which is being merged in; this is present in embodiments which extend the partition and then merge the system data. Likewise, the invention provides a signal in which the system data of a partition refers not only to that partition but also to the user data stored in at least one other partition which is being merged in; this is present in embodiments which merge the system data and then extend the partition edge(s).

Systems Generally

Figure 10:
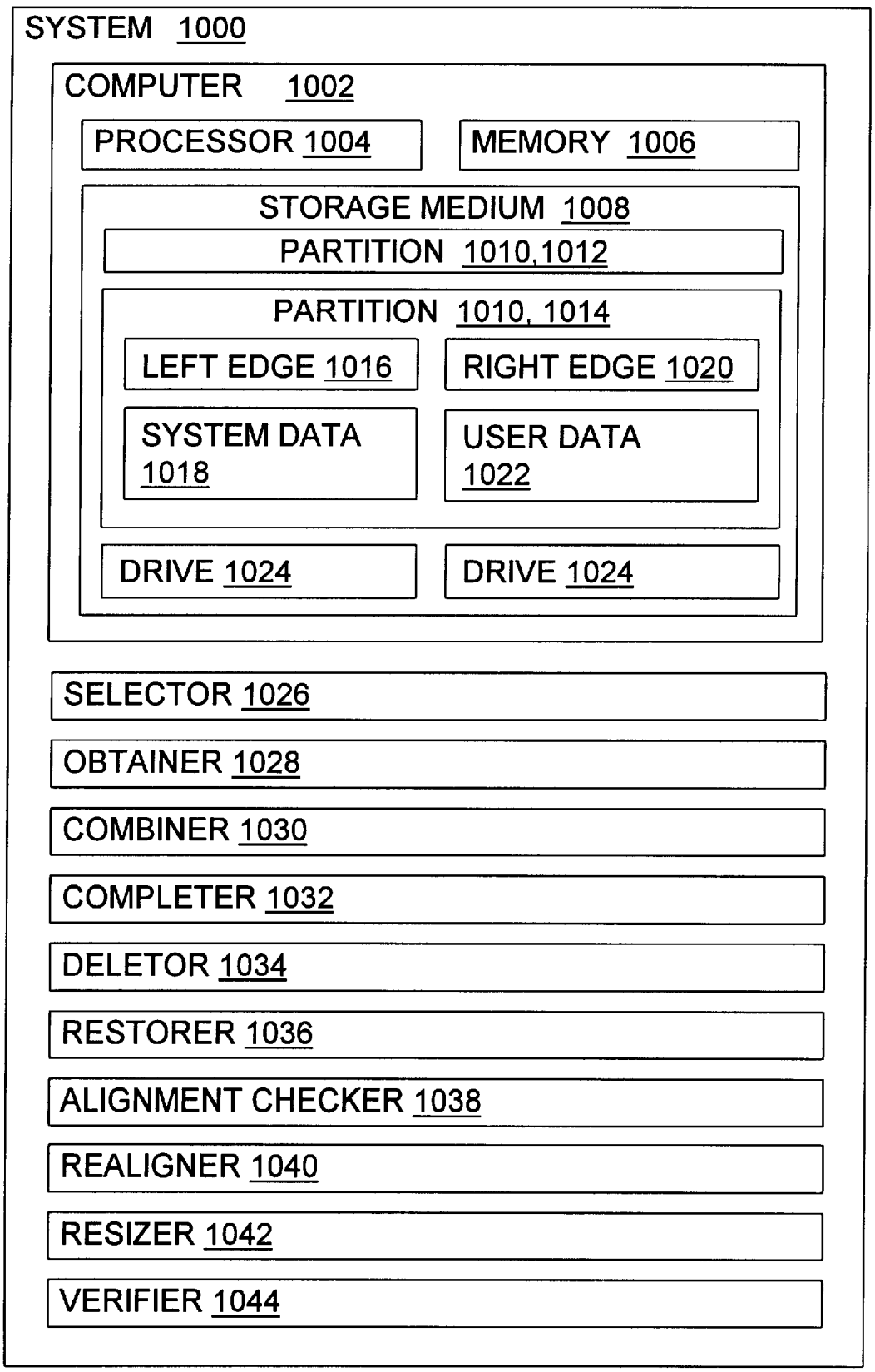
FIG. 10 is a diagram illustrating systems according to the invention.

FIG. 10 illustrates a system 1000 according to the invention. The system 1000 shown includes a computer 1002 which includes at least one processor 1004 for executing instructions, a memory 1006 such as RAM and/or ROM for storing instructions, and a storage medium 1008 for holding data in sectors in partitions. The storage medium 1008 includes one or more non-volatile storage devices 1024, such as magnetic or optical disk drives like the one shown in FIG. 1. The memory 1006 and the storage medium 1010 can be written and read by execution of appropriate processor 1004 instructions.

The storage medium 1008 also includes at least two partitions 1010. Each partition has a left edge 1016 at the partition's starting address and a right edge 1020 at the partition's ending address. Bach partition contains system data 1018, and at least one of the partitions also contains user data 1022.

With regard to the invention, the behavior of the system 1000 components generally follows the methods of the invention discussed herein. For instance, the obtaining step 610 may be performed by an obtainer 1028, the completion step 620 may be performed by a completer 1032, and son on. Likewise, those of skill in the art will bring to bear their knowledge of system 1000 components in following the inventive methods. The system 1000 is for illustration; many other systems may also be configured according to the invention, with the functionality of the components shown in FIG. 10 omitted, repeated, grouped differently, and/or renamed.

The system 1000 contains a selector 1026 which selects a cluster size and a partition type for the merged partition. The selector 1026 may be embodied in software which runs on the computer 1002 and which reflects the semantic constraints normally imposed on partitions, and therefore only selects partition sizes which are valid. The selector 1026 may use default selections coded into the implementing program, selections provided interactively by a user during a particular merge, or both.

The system also contains an obtainer 1028 which obtains an area on the target partition large enough to contain the combined system data for the partitions. For FAT systems, the obtainer 1028 is implemented such that the target partition area is located at the right edge of the current target partition's system area. The obtainer 1028 moves the user data from the required area as needed without destroying it. The data may be copied to a "safe" location on the medium 1008, and then copied from there into its destination. A safe location is a permanent location which will not be overwritten by normal operation of the system.

The system also contains a combiner 1030 which combines the target partition system data and the secondary partition system data and stores the combined system data on the target partition. This creates a target partition system area which contains the system data formerly contained in the target and secondary partitions. Up through this step a restorer 1036 can successfully recover the original partitions, returning the storage medium 1008 to its pre-merge state. The combiner 1030 meshes the data in the target and secondary partitions in such a way that at least one copy of all system data is on disk at all times, thereby reducing the risk of loss if an interruption occurs.

The system also contains a completer 1032 which completes the merge of each secondary partition. Once the completion step is begun, the two or more original partitions can no longer be guaranteed to be restored by the implementing program. In the preferred embodiment if the merge operation is fails, the merged partition can still be recovered. The completer 1032 writes the combined system data into its appropriate location in the appropriate fashion, as is understood by those of skill in the art in view of the teachings herein. For example, if the merged partition type is FAT, then the system data will reside near the left edge of the furthest left selected partition.

Once the system data has been safely written, the preferred implementation modifies the target partition's boundaries as necessary. This entails writing the new physical sector address of the merged partition starting address 302 if a secondary partition to the left of the target partition is being merged; and/or writing the new physical sector address of the merged partition ending address 304 if a secondary partition to the right of the target partition is being merged. The partition table is also modified, removing secondary partitions which have been merged. If a logical partition is merged into a primary partition to form a primary merged partition, then the extended partition must have its boundary readjusted accordingly.

After the combined system data is successfully written into the target partition system area, the original copy of the secondary system data is deleted using a deletor 1034. The deletor "removes" (frees/marks as unallocated) the system data of partitions which have been removed by the merger. Preferably, the deletor 1034 checks to ensure that the secondary partitions have been successfiully merged before removing their system files. One embodiment ensures that all redundant copies of such system data, such as copies of file allocation tables, are removed as well.

The restorer 1036 optionally removes the merged partition and restores the cluster size, partition type, left edge, right edge, system data, and user data of the target partition and each secondary partition. The restorer 1036 may include the functionality discussed in connection with the returning step 630. Like other components of the system 1000, the restorer 1036 may also include functionality from temporally distributed steps such as the progress storing step 608 and the verifying step 622.

An alignment checker 1038 looks at the selected partitions and determines if all of their clusters lie on appropriate sector addresses, as discussed in connection with FIGS. 8 and 9. If not, the alignment checker 1038 determines which partition(s) should have their data moved. One partition is chosen as the base partition and the other partitions are chosen to be realigned with regards to it.

A realigner 1040 accepts data from the alignment checker 1038 identifing zero or more partitions that need their data realigned. The realigner 1040 then realigns the clusters on the appropriate partitions as discussed in connection with step 612. The realigner 1040 likewise readjusts the system files/system data in those selected partitions so that when the partitions are merged the system data that is used matches the current (realigned) state of each partition.

As noted, the final merged partition can have a different cluster size than one or more of the selected partitions 1012, 1014, and the target and secondary partitions can have different cluster sizes. A resizer 1042 resizes the clusters of one or all of the selected partitions so that all selected partitions have the same cluster size. Sometimes the size of the target and/or secondary partitions will be changed because a user has chosen a different cluster size for the merged partition than the cluster size of one or more selected partitions. The resizer 1042 also readjusts the system files in the affected partitions so that when the partitions are merged their system data is correct.

A verifier 1044 performs integrity checks to avoid data loss by verifying the integrity and internal consistency of system data. These integrity checks are discussed elsewhere, including within the discussion of FIG. 6. In a preferred embodiment the verifier 1044 is invoked before modifying any data in a partition, and in some embodiments the verifier is again invoked again after the data is modified. Although the verifier 1044 is shown for clarity as a separate component, in practice the verifier 1044 functionality may be distributed through one or more of the other illustrated components.

Progress marking functionality is preferably distributed through one or more of the illustrated components. Progress markers may be stored on the disk or in other non-volatile storage (e.g., CMOS or battery-backed RAM) to show how far an individual component, such as the combiner 1030, realigner 1040, and/or resizer 1042 have progressed when processing the data on one or more partitions. If one or more of these components is interrupted, then the progress marker allows the component to resume from the point indicated by the progress marker, rather than being forced to redo the entire operation or, worse still, to lose data because the partitions are in an unknown state. Progress marking may rely on currently known tools and techniques, such as recovery partition indicators, recovery sectors, journaling, and/or checkmarking; see U.S. Pat. Nos. 5,675,769 and/or 5,706,472.

The software which implements partition merging may be loaded for execution from a drive 1024 on the computer 1002 that holds the selected partition. Alternatively, the implementing software may be loaded over a network or another connection from a file server or some other computer. The user interface, or a portion thereof, may run on a first computer while the partition merging engine controlled by the interface runs on a second computer to merge partitions of the second computer, using the network to carry commands and status updates.

Suitable software and/or hardware implementations of the illustrated components of the invention are readily provided by those of skill in the art using the teachings presented here and programming languages and tools such as Java, Pascal, C++, C, Perl, shell scripts, assembly, firmware, microcode, logic arrays, PALs, ASICs, PROMS, and/or other languages, circuits, or tools.

Additional Information

To further assist those of skill in understanding and properly practicing the invention, additional details are provided below. These details illustrate preferred embodiments of the invention, with the continued assumption that discussions of any one of the embodiment types (methods, systems, configured storage media) also apply to the other embodiment types unless clearly indicated otherwise. Likewise, those of skill in the art will apply concepts discussed in merging FAT partitions to embodiments which merge NTFS partitions, and vice versa. For instance, use of a temporary NTFS MFT suggests use of a temporary FAT file allocation table.

FAT Merge Candidate Verification

In presently preferred embodiments which merge FAT partitions a given partition is a valid merge candidate only if the partition contains a FAT12, FAT16, or FAT32 file system. It may not be an NT Fault Tolerant FAT partition. It must also have an adjacent FAT or FAT32 partition. Extended partitions, Extended Partition Boot Records (EPBRs), and free space are ignored when making this determination. For a secondary partition to be merged into a target partition, the secondary partition must meet the same criteria as the target partition, and the two must be adjacent (allowing free space, extended partition, and EPBRs between but no intervening primary or logical partitions). Each partition must have enough free space to have its data reclustered (if necessary) to the specified resulting cluster size.

Merging Two FAT Partitions

The following is a method to merge two specified FAT partitions:

1. Precheck (verify) the file systems. Both file systems must be free from file system errors before proceeding.

2. Determine which partition to align to and the optimum alignment. The partition to align to (the "alignment partition") is selected to cause the least amount of data to be moved. That is, align to the partition that has the most data in it. Once this selection has been made, calculate the optimum alignment is based on the same algorithm used in a normal partition resize operation, as discussed in U.S. Pat. Nos. 5,675,769 and/or 5,706,472.

3. Calculate the FAT parameters of the resulting partition. This will describe the size of the file allocation table, root directory (if the resulting partition is not FAT32), the number of reserved sectors, and the sectors per cluster.

4. Calculate the shift factor. The data on both partitions must be able to be aligned with the new cluster size. If the data on the partition that was not selected as the "alignment partition" does not start at the beginning of a resulting cluster, then the data in that partition must be shifted to meet this restriction; this is discussed further below.

5. Create dynamic roots if needed. If the secondary partition is FAT (not FAT32) then the root directory must be converted to a dynamic directory because it will become a subdirectory of the root directory on the target partition. The target partition may also need to have its root directory converted to a dynamic directory if the target partition is FAT and the resulting partition type is FAT32. This conversion is the same used in the partition resize code with the addition that the secondary partition's root must be adapted to become a subdirectory by adding the '.' and '..' entries, removing the volume label, and setting the correct parent cluster numbers for the first level subdirectories.

6. Shift the data in the partition that needs to be adjusted. This uses the shift factor calculation to shift the data in the specified partition.

7. If the cluster size is increasing on either partition then these partitions will need to be aligned. This is the same operation as a current resize operation.

8. Vacate areas on the left partition for the new file allocation table (and root directory if a FAT16 partition). The left partition will have its system structures expanded to meet the requirements of the resulting partition. The area which will be occupied by the system structures will need to be cleared of data to make room for the system structures. This is the same procedure used with a resize operation.

9. Perform the file allocation table merge, as detailed below. This step actually writes out the new boot sector(s), file allocation tables and directory structure for the resulting partition.

10. Close the secondary file system object—it will no longer be needed. At this point destroy the in-memory file system object representing the secondary file system.

11. Change the partition table entries. This step will handle deleting the secondary partition from the on-disk partition table, and resize the extended partition, if needed, to include or be clear of the resulting partition. The partition table entry for the resulting partition is resized to enclose the resulting partition.

12. Change the partition type of the target partition table entry to the resulting partition type.

13. Postcheck the resulting partition to make sure that the process has completed correctly and verify that there are no file system errors from the merge operation.

Aligning Clusters in FAT Partitions

During the aligning step 612, two or more FAT partitions are aligned. This may be accomplished as described below. This algorithm aligns the data of a partition on a specified sector offset from the current data start by padding the number of reserved sectors in a FAT or FAT32 file system. This is done in a safe way by writing markers after moving a block so that the operation can be completed even if a fatal event interrupts the operation.

1. Unmount the file system/volume/partition. Change the partition type to PQRPI (3CH) or some other recovery partition indicator, as discussed in U.S. Pat. Nos. 5,675,769 and/or 5,706,472.

2. Determine the amount of space needed at the end of the file system to be able to pad the reserved sectors by the specified shift factor. The data will always be shifted by one track plus the shift factor, so markers can be written without overwriting any data.

3. Vacate any data at the end of the partition that is in the first copy area. That is, move the data to another location, without destroying the data. Tools and techniques for clearing data from a specified region are discussed in U.S. Pat. Nos. 5,675,769, 5,706,472 and 5,930,831.

4. Get the sector number of the last used cluster. Nothing needs to be shifted beyond the last cluster, so time may be saved by starting at the last used cluster and working toward the front of the partition.

5. Move the data. One track is moved at a time to an area greater than one track away from the source. A marker sector is then written in the first sector of the source. The sequence is then repeated until the beginning of the FAT has been moved.

6. Change the number of reserved sectors in the boot record.

7. Clear any markers that may be visible at the beginning of the partition so a spurious recovery attempt will not be made if power is lost at this point.

8. Change the partition type back to its original type.

9. Remount the file system/volume/partition.

Merging the File Allocation Tables and Directory Structures in a FAT File System During the combining step 618, the system data on the target and secondary FAT partitions may be merged by the following steps.

1. Setup the new file system structure, referred to here as FAT_VARS. It should contain all of the information that a FAT_FILESYSTEM object needs to describe the resulting file system parameters.

2. Create a new FAT object in memory to translate the existing clusters into.

3. Translate bad sectors into the new FAT.

4. Create two directory objects (one for the left partition and one for the right) and read in the directory tree for both partitions.

5. If the root directory of either directory object is being converted from static to dynamic, then change the root to the directory matching the starting cluster of the dynamic root.

6. If the target root is being converted to a static root then notify the directory object that it will be converting to a static root. This is accomplished by setting the sector numbers for the directory blocks in memory that comprise the root directory.

7. Change the file system objects to point to the dynamic roots instead of static roots if applicable.

8. Build the portion of the file allocation table from the right directory and adjust the cluster numbers of the directory entries.

9. Build the portion of the file allocation table from the left directory and adjust the cluster numbers of the directory entries.

10. Add secondary partition root directory as a subdirectory of the target root. This is accomplished by adding a root level directory in the target root which is then linked to the new cluster location of the secondary partition root directory.

11. If the result is a FAT32 partition then set the root directory cluster in the new FAT_VARS structure. This records the location of the dynamic root and will be written to the boot sector.

12. Write the new boot record, file allocation tables and all directory entries (since their cluster numbers have been updated in memory) to disk during the merger completion step 620.

Merging NTFS Partitions

When creating a merged NTFS partition's file system a new set of system files is created for storing the target partition's files as well as adding the new partition's files. If there is not enough free space on the target partition for this new set of system files, the merge is not allowed to continue.

To avoid problems with file or directory name conflicts when doing an NTFS partition merge, a new directory (specified by the user) is created in the root directory of the target partition. All the secondary partition's files are copied into the new directory. The secondary partition's file structure will be duplicated from this point. Even though NT has the ability to have multiple "root" directories this is not used.

When two logical NTFS partitions are merged, the resulting partition will also be a logical partition, at least initially. From the user point of view, a particular merge could also include conversion between logical and primary status, although this would be implemented internally as a separate function. When a logical is merged into a primary partition the resulting target partition will be a primary partition. In the preferred embodiment, multiple primary partitions are not merged because of the risk of damaging bootability if both partitions contain an operating system. For instance, bootability could be lost if the first partition on the disk is a primary bootable partition and it is merged into an adjacent logical partition.

NT supports having its "boot" partition on a primary or a logical partition. Because of this, when merging two logical partitions if both of them are "bootable" NT operating system partitions, only the remaining target partition will be bootable and the entry for the other partition will be removed from the boot.ini file. The boot sector will be updated so that its sector count matches the sector count of the new partition.

There are cases when the two partitions do not have the same cluster alignment. This results in the need to realign one partition's entire data. This realignment is done in such a way that if during realignment there is a power failure the merge function can be restarted and continue to completion.

Since NTFS supports multiple cluster sizes, the cluster sizes on the two partitions to merge may be different. The smallest cluster size on either partition is selected as the merged partition's cluster size. If the sizes are the same no clusters will change. If the cluster sizes are different, the partition with the larger cluster size has its clusters changed to match the new size.

The two partitions to be merged are selected by the user through the user interface. Both partitions are checked to see if they are NTFS partitions. Also, the partitions are checked to make sure that they are adjacent to each other (in the sense described herein). After this the secondary partition may be checked to make sure that it is not a primary partition, to reduce the risk of losing bootability.

After the partitions are selected and validated the internal consistency of the file system on each partition is verified. If either partition has an error the merge will not be allowed to continue. After the partitions are found to be correct, the data merge starts.

To provide data safety, the merge of the secondary partition's files into the target partition's file system will be done into a temporary set of system files on the target partition. The amount of space needed is computed by taking the amount of space needed by the target partition's system structures and adding that size to the size of the secondary partition's file system structures. If there is available free space (preferably on the target partition) equal or greater to this size, then the merge of the partitions' file systems will be done into a temporary set of system files stored in that available space. If there is not available free space for the temporary copy of the MFT and other system files, then the merge will not be allowed.

After verifying that enough space exists for storing a temporary copy of the file system structures, the volumes (i.e., partitions) are aligned on the same sector boundaries. For example, If the first volume's clusters start on an odd sector then all its clusters will start on odd sector boundaries. However, if first volume's clusters start on an odd sector and the second volume's clusters start on an even sector boundary, then combining the two volumes without aligning one volume's clusters to match the other volume would produce data corruption. There are at least two ways to do a realignment. The volume to be realigned can have all of its data copied to temporary space, with the correct offset for the alignment, one cluster at a time. Alternately, both volumes can have their cluster size changed to the sector size (i.e., set the cluster size to one sector per cluster), and that takes care of the realignment problem. Since it may be necessary to change cluster size if the two partitions have different cluster sizes, alignment is most easily done by making the cluster size on both partitions the same as the sector size.

The final step in preparing for merge completion is to make sure both volumes are using the same cluster sizes. If there are differences the partition with the larger cluster size will have its cluster size changed to match the smaller cluster size. This requires changing the boot sector value for the cluster size, as well as changing every cluster reference in the MFT. For example, if the old cluster size was four sectors and now it is changing to two sectors, then the starting cluster locations in each file need to be divided by the factor two (since old cluster size four is a factor of two times greater than the new cluster size two) and the cluster count is incremented accordingly. Each cluster offset will also be decreased by the factor two and its cluster count incremented. After changing the cluster size in all the files, the selected partitions are ready to have their data merged.

A temporary MFT and other system files are created in the available free space on the target partition. This temporary MFT will eventually become the combined partition's real MFT. The temporary MFT and other system files are created showing the total space in the combined partitions. After this the system data for the target partition's files are copied to the new MFT so that it is a duplicate of the original MFT, except for total cluster number and maybe cluster size. Then the new MFT is expanded to align on an multiple of 64 for File Record Segments (FRSs). This will enable the MFT bitmap and the volume bitmaps to be combined directly (since they are always allocated in 64 bit chunks) and make it unnecessary to shift the bits when combining them. After this, the runs from the secondary partition's MFT (but not the system runs) are copied to the temporary MFT and all these FRS numbers are offset by a delta reflecting where they were added from the end of the data from the first MFT. The new files have their starting cluster numbers updated to be the original value plus the size of the target partition. The volume bitmap from the secondary volume is then appended to the temporary volume bitmap. The MFT bitmap from the secondary volume is combined with the temporary volume bitmap (minus the location of the system files).

The new directory for the secondary volume's files is added to the temporary MFT's root directory. All the system data for files from the secondary volume are stored there. All references to the secondary volume's original root directory are changed to the new directory. All the other files and directories are subdirectories off of this new directory; they will not need their parent directories changed because of the offset step done earlier. All references to the original drive should be changed to the target volume's drive letter using functionality like that found in the PowerQuest Drive Mapper tool.

The copy partition and target partition have their partition types changed to PQRPI or an equivalent value, namely, one that is recognized by the implementing software but not by the operating system. The target partition size is expanded to include the space in the secondary partition (and any free space between the two partitions). The boot sector and backup boot sectors are rewritten to show the correct volume size as well as being set to point to the new MFT. The old MFT and system files are then removed from the volume bitmap. The boot.ini file is updated if it referred to the secondary partition. The secondary partition entry is deleted from the partition table and any extended partition involved is resized as needed. The backup boot sector is updated and the allocation bitmap is accordingly updated if necessary. Finally, the file system of the target partition is changed from PQRPI (or equivalent) back to NTFS.

Errors in either NTFS partition will stop the conversion from happening. Errors will be marked as critical and the merge will not be allowed. Warnings when doing the checks will not stop the merge but will cause a warning to be displayed and the user will be given the option to cancel the operation.

After the merge has started, both NTFS volumes will be kept intact until the last steps. Because of this, any errors during the merge will cause the temporary MFT and system files to be corrupted, but that won't affect either partition since the original MFTs are both still active. During the last steps the partition will be changed to a PQRPI partition and any errors at this point will leave the partition in an inaccessible state to the operating system but the temporary MFT and system files will be correct. To recover after a power failure, copy the NTFS boot sector and make its values match the size in the temporary MFT and have it point to the new MFT. The partition type can then be changed and the merge operation can be completed.

Summary

In summary, the present invention provides methods, configured storage media, and systems for efficient, correct, and safe merging of partitions. Even if the merge operation is interrupted, in many cases the merge can either complete successfully or the original partitions can be restored. Cluster size, and to a limited extent, file system type, may be changed during the merge. Continued use of applications that were stored in secondary partitions before the merge can be promoted by changing drive letters with functionality like that found in the PowerQuest MagicMover and Drive Mapper tools (marks of PowerQuest).

More particularly, the invention provides partition merging which combines two adjacent FAT or FAT32 partitions by removing one partition from the partition table, building a new file allocation table that describes the new combined partition, and creating a root level directory on the resulting partition that contains the contents of the secondary partition that is merged into the expanding target partition. The target partition can be on either the left or the right of the secondary partition, and at some points in the algorithm it is necessary to operate on the left or the right partition regardless of whether it is a target or a secondary partition. The selected partitions may have free space between them, which will be absorbed by the resulting partition. The user may specify a FAT or FAT32 partition or any combination of the two file systems as candidates for the merge process. If the resulting partition is small enough, the user may select that the resulting file system be FAT, otherwise it will be converted to FAT32 in the process. The expanding partition will generally retain its partition class (Primary/Logical), so the resulting merged partition will be the same partition class as the expanding target partition. For each secondary partition, the user chooses the name of a directory in the resulting partition's directory tree; the directory holds the user data of the secondary partition.

The invention also gives users the power to merge two separate NTFS volumes into one resulting file system. This allows the user to organize files on one volume (i.e., partition) instead of two if desired. A secondary volume is "copied" to a target volume without necessarily making another copy of the user data on disk. Partitions can be merged if they are both contain NTFS and they are adjacent to each other.

Although particular methods and systems embodying the present invention are expressly illustrated and described herein, it will be appreciated that system and configured storage medium embodiments may be formed according to the signals and methods of the present invention. Unless otherwise expressly indicted, the descriptions herein of methods and signals of the present invention therefore extend to corresponding systems and configured storage media, and the descriptions of systems and configured storage media of the present invention extend likewise to corresponding methods and signals.

As used herein, terms such as "a" and "the" and item designations such as "partition" are inclusive of one or more of the indicated item. In particular, in the claims a reference to an item means at least one such item is required. When exactly one item is intended, this document will state that requirement expressly.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for facilitating creation of a merged partition by combining at least two computer disk partitions, each partition having clusters, a cluster size, a partition type, a right edge, a left edge, system data, and user data, comprising the steps of:

selecting a target partition;

selecting at least one secondary partition;

choosing a cluster size for the merged partition;

choosing a partition type for the merged partition;

obtaining a space within the target partition large enough to hold the system data for the selected partitions; and combining target partition system data and secondary partition system data and storing the combined system data within the target partition to create merged partition system data which organizes user data originally found in the target partition and user data originally found in at least one secondary partition, wherein the target partition overlapped the at least one secondary partition.

2. The method of claim 1, further comprising completing the merger of each secondary partition into the target partition to produce the merged partition, the merged partition having the determined cluster size and the determined partition type, the method being performed without destroying user data of the target partition except at user request and without destroying user data of any secondary partition except at user request.

3. The method of claim 1, wherein the target partition is to the left of each secondary partition.

4. The method of claim 1, wherein the target partition is to the right of at least one secondary partition.

5. The method of claim 1, wherein the method is interrupted and the method further comprises preserving at least one copy of all system data of all partitions on the disk at all times, thereby reducing the risk of loss of system data from the target partition or from a secondary partition.

6. The method of claim 5, wherein the interruption is due to a user request to cancel merging.

7. The method of claim 5, further comprising the step of returning the selected partitions to their initial state with respect to cluster size, partition type, right edge, left edge, system data and user data.

8. The method of claim 5, wherein the disk partitions are located on a disk drive, the disk drive communicates with at least one source of electric power, and wherein the interruption is due to an interruption in the disk drive's communication with the source of electric power.

9. The method of claim 1, wherein the method is interrupted and the method further comprises preserving at least one copy of all user data of all selected partitions on the disk at all times, thereby reducing the risk of loss of user data from the target partition or from a secondary partition.

10. The method of claim 8, wherein the interruption is due to a user request to cancel merging.

11. The method of claim 8, wherein the disk partitions are located on a disk drive, the disk drive communicates with at least one source of electric power, and wherein the interruption is due to an interruption in the disk drive's communication with the source of electric power.

12. The method of claim 1, in which the clusters in the target partition are not aligned in relation to the clusters in at least one secondary partition, and the method further comprises the step of realigning clusters in at least one partition.

13. The method of claim 12, wherein the cluster size is measured in sectors, and wherein the realigning step comprises making the cluster size of the partitions equal to one sector per cluster.

14. The method of claim 12, wherein the realigning step further comprises identifying the partition with the most user data and realigning at least one other partition so its clusters are aligned in relation to the clusters in the partition with the most user data.

15. The method of claim 1, wherein the method stores progress markers which correspond to performance of incrementally increasing portions of the method.

16. The method of claim 1, wherein at least one selected partition has a smaller cluster size than at least one other selected partition, and where the smaller cluster size is chosen to be the cluster size for the merged partition.

17. The method of claim 1, wherein the cluster size of at least one selected partition is different than the chosen cluster size for the merged partition, and further comprising the step of changing the cluster size in at least one selected partition to the chosen cluster size.

18. The method of claim 1, wherein the secondary partition contains a root directory and a new directory is created within the target partition to store the root directory of the secondary partition.

19. The method of claim 1, wherein one of the selected partitions is a logical partition and another selected partition is a primary partition.

20. The method of claim 1, wherein the merged partition is a logical partition.

21. The method of claim 1, wherein the merged partition is a primary partition.

22. The method of claim 1, further comprising the step of verifing the integrity and consistency of the system data of the selected partitions.

23. The method of claim 1, further comprising the step of verifying the integrity and consistency of the system data of the merged partition.

24. The method of claim 1, wherein at least one selected partition is a FAT partition.

25. The method of claim 1, wherein at least one selected partition is a NTFS partition.

26. The method of claim 1, wherein at least one selected partition is a NetWare partition, and volume segments from different volumes are not being merged.

27. A system, containing a target partition and at least one secondary partition, each partition having clusters, a cluster size, a partition type, a left edge and a right edge, and each partition comprising system data in a system data area and user data in a user data area, for producing a merged partition, the system comprising:

a computer having a processor, a memory, and a storage medium divided into at least two partitions;

a selector, which selects a cluster size and a partition type for the merged partition;

an obtainer which obtains an area on the target partition large enough to contain the combined system data for the at least two partitions;

a combiner which combines the target system partition data and the secondary partition data and then stores the combined data on the target partition, thereby creating a target partition system area which corresponds to the target partition and the secondary partition(s); and a completer which completes the merge of each secondary partition into the target partition to produce the merged partition, the system preserving all user data in the target partition and preserving all user data in each secondary partition, the system operating at least in part by performing at least one of:
combining the system data and then extending the target partition to overlap the secondary partition(s); and
extending the target partition to overlap the secondary partition(s) and then combining the system data.

28. The system of claim 27, further comprising a deleter which deletes the system data of at least one secondary partition after the merged partition has been produced.

29. The system of claim 27, further comprising a restorer, which when used prior to the completing step, removes the merged partition and restores the cluster size, partition type, left edge, right edge, system data, and user data of the target partition and each secondary partition, thereby allowing recovery of the target and secondary partitions if the production of a merged partition is interrupted.

30. The system of claim 27, wherein the system further comprises an alignment checker which determines whether a partition needs to have its clusters realigned, and the system further comprises a realigner which realigns those clusters of the partition which the alignment checker has determined need to be aligned.

31. The system of claim 27, wherein the system stores progress markers on the disk within at least one partition being merged, the progress markers corresponding to incrementally increasing portions of the merged partition production.

32. The system of claim 27, wherein the system further comprises a cluster size checker which determines whether a partition needs to have its clusters resized, and the system further comprises a cluster resizer which resizes those clusters of the partition which the cluster size determiner has determined need to be resized.

33. The system of claim 27, wherein the system preserves at least one copy of all system data of all merging partitions on the disk at all times, thereby reducing the risk of loss of system data if the system is interrupted.

34. The system of claim 27, further comprising a verifier, which verifies the integrity and internal consistency of the system data of the target partition and each secondary partition.

35. In a computer system containing a partitionable storage medium, the improvement comprising a means for merging two partitions without destroying user data except as requested by a user by performing at least one of:

combining system data and then extending a target partition to overlap a secondary partition; and extending a target partition to overlap a secondary partition and then combining system data.

36. The partition merging means improvement of claim 35, comprising a means for merging two FAT partitions.

37. The partition merging means improvement of claim 35, comprising a means for merging two NTFS partitions.

38. The partition merging means improvement of claim 35 in a computer network, comprising a means for remotely merging two partitions.

39. The partition merging means improvement of claim 35, comprising a means for realigning a partition.

40. The partition merging means improvement of claim 35, comprising a means for combining file allocation tables.

41. The partition merging means improvement of claim 35, comprising a means for combining system files.

42. The partition merging means improvement of claim 35, comprising a means for updating a boot record to reflect the merger of partitions.

43. The partition merging means improvement of claim 35, comprising a means for updating a partition table to reflect the merger of partitions.

44. A configured computer program storage medium which contains software to perform method steps for merging disk partitions, the method steps comprising:

selecting a target partition;

selecting at least one secondary partition;

obtaining a space large enough to hold system data for the selected partitions;

combining target partition system data and secondary partition system data and then storing the combined data within the obtained space; and completing the merger of each secondary partition into the target partition to produce the merged partition while extending the target partition over each secondary partition.

45. The configured program storage medium of claim 44, wherein the method further comprises the step of storing progress markers which correspond to incrementally increasing portions of the method.

46. The configured program storage medium of claim 44, wherein the method further comprises preserving at least one copy of all system data of all selected partitions on the disk at all times.

47. The configured program storage medium of claim 44, in which the clusters in the target partition are not aligned in relation to the clusters in at least one secondary partition, and the method further comprises the step of realigning clusters in at least one partition.

48. A signal embodied in a computer system, the signal including first system data and first user data which were present in an unmodified first partition, a modified partition starting address and a modified partition ending address which delimit a modified first partition, and a second partition holding second system data and second user data, wherein the modified partition starting address and modified partition ending address delimit sectors containing the first system data, the first user data, the second system data, and the second user data, the signal being useful in merging partitions by extending a partition and then merging system data.

49. A signal embodied in a computer system, the signal including first user data which was present in an unmodified first partition, second user data which was present in an unmodified second partition, and modified system data present in a modified first partition, the modified system data referring to both the first user data and the second user data, the signal being useful in merging partitions by merging system data and then extending a partition.

* * * * *

UNITED STATES PATENT AND TRADEMARK OFFICE
CERTIFICATE OF CORRECTION

PATENT NO. : 6,185,666 B1
DATED : February 6, 2001
INVENTOR(S) : Golden E. Murray, Adam L. Bringhurst, Theron M. Stoddard It is certified that error appears in the above-identified patent and that said Letters Patent is hereby corrected as shown below:

Claims 44, 48, 49 read as follows:

44. A configured computer program storage medium which contains software to perform method steps for merging disk partitions, the method steps comprising:
  selecting a target partition;
  selecting at least one secondary partition;
  obtaining a space large enough to hold system data for the selected partitions;
  combining target partition system data and secondary partition system data and then storing the combined data within the obtained space; and
  completing the merger of each secondary partition into the target partition to produce the merged partition while extending the target partition over each secondary partition without destroying user data, except as requested by a user.

48. A signal embodied in a computer readable medium, signal including the system data and first user data which were present in an unmodified first partition, a modified partition starting address and a modified partition ending address which delimit a modified first partition, and a second partition holding second system data and second user data, wherein the modified partition starting address and modified partition ending address delimit sectors containing the first system data, the first user data, the second system data, and the second user data, the signal being used in merging partitions, the partition merging accomplished by extending a partition and then merging system data.

UNITED STATES PATENT AND TRADEMARK OFFICE
CERTIFICATE OF CORRECTION

PATENT NO. : 6,185,666 B1
DATED : February 6, 2001
INVENTOR(S) : Golden E. Murray, Adam L. Bringhurst, Theron M. Stoddard It is certified that error appears in the above-identified patent and that said Letters Patent is hereby corrected as shown below:

49. A signal embodied in a computer readable medium, the signal including first user data which was present in an unmodified first partition, second user data which was present in an unmodified second partition, and modified system data present in a modified first partition, the modified system data referring to both the first user data and the second user data, the signal being used in merging partitions, the partition merging accomplished by merging system data and then extending a partition.

Signed and Sealed this

Twenty-second Day of January, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,185,666 B1
DATED : February 6, 2001
INVENTOR(S) : Golden E. Murray, Adam L. Bringhurst, Theron M. Stoddard It is certified that error appears in the above-identified patent and that said Letters Patent is hereby corrected as shown below:

Claims 44, 48, 49 read as follows:

44. A configured computer program storage medium which contains software to perform method steps for merging disk partitions, the method steps comprising:
 selecting a target partition;
 selecting at least one secondary partition;
 obtaining a space large enough to hold system data for the selected partitions;
 combining target partition system data and secondary partition system data and then storing the combined data within the obtained space; and
 completing the merger of each secondary partition into the target partition to produce the merged partition while extending the target partition over each secondary partition without destroying user data, except as requested by a user.

48. A signal embodied in a computer readable medium, the signal including first system data and first user data which were present in an unmodified first partition, a modified partition starting address and a modified partition ending address which delimit a modified first partition, and a second partition holding second system data and second user data, wherein the modified partition starting address and modified partition ending address delimit sectors containing the first system data, the first user data, the second system data, and the second user data, the signal being used in merging partitions, the partition merging accomplished by extending a partition and then merging system data.

UNITED STATES PATENT AND TRADEMARK OFFICE
CERTIFICATE OF CORRECTION

PATENT NO.    : 6,185,666 B1
DATED         : February 6, 2001
INVENTOR(S)   : Golden E. Murray, Adam L. Bringhurst, Theron M. Stoddard It is certified that error appears in the above-identified patent and that said Letters Patent is hereby corrected as shown below:

49. A signal embodied in a computer readable medium, the signal including first user data which was present in an unmodified first partition, second user data which was present in an unmodified second partition, and modified system data present in a modified first partition, the modified system data referring to both the first user data and the second user data, the signal being used in merging partitions, the partition merging accomplished by merging system data and then extending a partition.

This certificate supersedes Certificate of Correction issued January 22, 2002.

Signed and Sealed this

Nineteenth Day of February, 2002

*Attest:*

JAMES E. ROGAN
*Director of the United States Patent and Trademark Office*

*Attesting Officer*